United States Patent
Kar et al.

(10) Patent No.: US 11,610,115 B2
(45) Date of Patent: Mar. 21, 2023

(54) LEARNING TO GENERATE SYNTHETIC DATASETS FOR TRAINING NEURAL NETWORKS

(71) Applicant: NVIDIA Corporation, Santa Clara, CA (US)

(72) Inventors: Amlan Kar, Toronto (CA); Aayush Prakash, Toronto (CA); Ming-Yu Liu, San Jose, CA (US); David Jesus Acuna Marrero, Toronto (CA); Antonio Torralba Barriuso, Somerville, MA (US); Sanja Fidler, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 622 days.

(21) Appl. No.: 16/685,795

(22) Filed: Nov. 15, 2019

(65) Prior Publication Data
US 2020/0160178 A1   May 21, 2020

Related U.S. Application Data

(60) Provisional application No. 62/827,313, filed on Apr. 1, 2019, provisional application No. 62/768,846, filed on Nov. 16, 2018.

(51) Int. Cl.
G06N 3/08     (2006.01)
G06F 16/901   (2019.01)
(Continued)

(52) U.S. Cl.
CPC .......... *G06N 3/08* (2013.01); *G06F 16/9024* (2019.01); *G06N 3/0454* (2013.01); *G06T 11/60* (2013.01); *G06T 2210/61* (2013.01)

(58) Field of Classification Search
CPC .... G06N 3/08; G06N 3/0454; G06F 16/9024; G06T 11/60; G06T 2210/61
See application file for complete search history.

(56) References Cited

U.S. PATENT DOCUMENTS 7,409,295 B2   8/2008   Paradie
8,204,642 B2   6/2012   Tanaka et al.
(Continued)

FOREIGN PATENT DOCUMENTS

DE   10 2015 221 920 A1   5/2017
DE   10 2015 226 762 A1   6/2017
(Continued)

OTHER PUBLICATIONS

Qi et al., "Human-centric Indoor Scene Synthesis Using Stochastic Grammar", Jun. 2018, IEEE/CVF Conference on Computer Vision and Pattern Recognition, p. 5899-5908 (Year: 2018).*
(Continued)

*Primary Examiner* — Ryan R Yang
(74) *Attorney, Agent, or Firm* — Taylor English Duma L.L.P.

(57) ABSTRACT

In various examples, a generative model is used to synthesize datasets for use in training a downstream machine learning model to perform an associated task. The synthesized datasets may be generated by sampling a scene graph from a scene grammar—such as a probabilistic grammar—and applying the scene graph to the generative model to compute updated scene graphs more representative of object attribute distributions of real-world datasets. The downstream machine learning model may be validated against a real-world validation dataset, and the performance of the model on the real-world validation dataset may be used as an additional factor in further training or fine-tuning the gen-
(Continued)

erative model for generating the synthesized datasets specific to the task of the downstream machine learning model.

23 Claims, 13 Drawing Sheets

(51) Int. Cl.
   *G06T 11/60* (2006.01)
   *G06N 3/04* (2023.01)

(56) References Cited

U.S. PATENT DOCUMENTS

| | | | |
|---|---|---|---|
| 9,373,057 B1 | 6/2016 | Erhan et al. | |
| 9,489,635 B1 | 11/2016 | Zhu | |
| 9,701,307 B1 | 7/2017 | Newman et al. | |
| 10,007,269 B1 | 6/2018 | Gray | |
| 10,108,867 B1 | 10/2018 | Vailesol-Gonzalez et al. | |
| 10,133,274 B2 | 11/2018 | Shashua et al. | |
| 10,134,278 B1 | 11/2018 | Konrardy et al. | |
| 10,157,331 B1 | 12/2018 | Tang et al. | |
| 10,235,601 B1* | 3/2019 | Wrenninge | G06K 9/6256 |
| 10,289,469 B2 | 5/2019 | Fortino et al. | |
| 10,372,136 B2 | 8/2019 | Yang et al. | |
| 10,474,917 B2* | 11/2019 | Sharma | G06V 10/987 |
| 10,489,972 B2 | 11/2019 | Atsmon | |
| 10,580,158 B1 | 3/2020 | Mousavian et al. | |
| 10,599,546 B1 | 3/2020 | Walther et al. | |
| 10,625,748 B1 | 4/2020 | Dong et al. | |
| 10,635,110 B2 | 4/2020 | Shashua et al. | |
| 10,679,046 B1* | 6/2020 | Black | G06N 3/0454 |
| 10,730,517 B2 | 8/2020 | Park et al. | |
| 10,739,778 B2 | 8/2020 | Winkler et al. | |
| 10,740,954 B2 | 8/2020 | Liu | |
| 10,776,985 B2 | 9/2020 | Liu et al. | |
| 10,816,978 B1 | 10/2020 | Schwalb | |
| 10,829,793 B2 | 11/2020 | Arikawa et al. | |
| 10,885,698 B2 | 1/2021 | Muthler et al. | |
| 10,942,030 B2 | 3/2021 | Haque et al. | |
| 10,997,433 B2 | 5/2021 | Xu et al. | |
| 11,042,163 B2 | 6/2021 | Chen et al. | |
| 11,079,764 B2 | 8/2021 | Nister et al. | |
| 11,080,590 B2 | 8/2021 | Smolyanskiy et al. | |
| 11,099,558 B2 | 8/2021 | Huang et al. | |
| 11,150,663 B2 | 10/2021 | Shirvani et al. | |
| 11,210,537 B2 | 12/2021 | Koivisto et al. | |
| 2004/0252864 A1 | 12/2004 | Chang et al. | |
| 2007/0154068 A1 | 7/2007 | Stein et al. | |
| 2007/0182528 A1 | 8/2007 | David et al. | |
| 2009/0125177 A1 | 5/2009 | Tanaka et al. | |
| 2009/0256840 A1 | 10/2009 | Varadhan et al. | |
| 2015/0054824 A1 | 2/2015 | Jiang | |
| 2015/0346716 A1 | 12/2015 | Scharfe et al. | |
| 2016/0247290 A1 | 8/2016 | Liu et al. | |
| 2016/0321074 A1 | 11/2016 | Hung et al. | |
| 2017/0010108 A1 | 1/2017 | Shashua | |
| 2017/0090478 A1 | 3/2017 | Blayvas et al. | |
| 2017/0220876 A1 | 8/2017 | Gao et al. | |
| 2017/0236013 A1 | 8/2017 | Clayton et al. | |
| 2017/0259801 A1 | 9/2017 | Abou-Nasr et al. | |
| 2017/0344808 A1 | 11/2017 | El-Khamy et al. | |
| 2017/0364083 A1 | 12/2017 | Yang et al. | |
| 2017/0371340 A1 | 12/2017 | Barak et al. | |
| 2018/0089833 A1 | 3/2018 | Lewis et al. | |
| 2018/0121273 A1 | 5/2018 | Fortino et al. | |
| 2018/0136332 A1 | 5/2018 | Barfield et al. | |
| 2018/0158244 A1 | 6/2018 | Ybanez Zepeda et al. | |
| 2018/0188059 A1 | 7/2018 | Wheeler et al. | |
| 2018/0203959 A1 | 7/2018 | Refsnaes et al. | |
| 2018/0232663 A1 | 8/2018 | Ross et al. | |
| 2018/0267558 A1 | 9/2018 | Tiwari et al. | |
| 2018/0276278 A1 | 9/2018 | Cagan et al. | |
| 2018/0348374 A1 | 12/2018 | Laddha et al. | |
| 2018/0349746 A1 | 12/2018 | Vallespi-Gonzalez | |
| 2018/0370540 A1 | 12/2018 | Yousuf et al. | |
| 2018/0373980 A1 | 12/2018 | Huval | |
| 2019/0016285 A1 | 1/2019 | Freienstein et al. | |
| 2019/0065933 A1 | 2/2019 | Bogdoll et al. | |
| 2019/0066328 A1 | 2/2019 | Kwant et al. | |
| 2019/0071101 A1 | 3/2019 | Emura et al. | |
| 2019/0102646 A1 | 4/2019 | Redman et al. | |
| 2019/0102668 A1 | 4/2019 | Yao et al. | |
| 2019/0129831 A1 | 5/2019 | Goldberg | |
| 2019/0147600 A1 | 5/2019 | Karasev et al. | |
| 2019/0147610 A1 | 5/2019 | Frossard et al. | |
| 2019/0171912 A1 | 6/2019 | Vallespi-Gonzalez et al. | |
| 2019/0179979 A1 | 6/2019 | Melick | |
| 2019/0212749 A1 | 7/2019 | Chen et al. | |
| 2019/0213481 A1 | 7/2019 | Godard et al. | |
| 2019/0250622 A1 | 8/2019 | Nister et al. | |
| 2019/0251442 A1 | 8/2019 | Koivisto et al. | |
| 2019/0258251 A1 | 8/2019 | Ditty et al. | |
| 2019/0286153 A1 | 9/2019 | Rnkawat et al. | |
| 2020/0013176 A1 | 1/2020 | Kang et al. | |
| 2020/0143205 A1 | 5/2020 | Yao et al. | |

FOREIGN PATENT DOCUMENTS

| | | | | |
|---|---|---|---|---|
| EP | 1 930 863 A2 | 6/2008 | | |
| EP | 2 384 009 A2 | 11/2011 | | |
| EP | 3185113 A1 * | 12/2015 | | G06F 3/0484 |
| KR | 10-2012-0009590 A | 2/2012 | | |
| WO | 2012/011713 A2 | 1/2012 | | |
| WO | 2016/183074 A1 | 11/2016 | | |
| WO | 2018/002910 A1 | 1/2018 | | |
| WO | 2018102717 A1 | 6/2018 | | |

OTHER PUBLICATIONS https://www.unrealengine.com/.
M. Bińkowski, D. J. Sutherland, M. Arbel, and A. Gretton. Demystifying mmd gans. ICLR, 2018.
A. Brock, J. Donahue, and K. Simonyan. Large scale gan training for high fidelity natural image synthesis. arXiv preprint arXiv:1809.11096, 2018.
G. Brockman, V. Cheung, L. Pettersson, J. Schneider, J. Schulman, J. Tang, and W. Zaremba. Openai gym. In arXiv:1606.01540, 2016.
D. J. Butler, J. Wulff, G. B. Stanley, and M. J. Black. A naturalistic open source movie for optical flow evaluation. In A. Fitzgibbon et al. (Eds.), editor, ECCV, Part IV, LNCS 7577, pp. 611-625. Springer-Verlag, 2012.
Y. Chebotar, A. Handa, V. Makoviychuk, M. Macklin, J. Issac, N. Ratliff, and D. Fox. Closing the sim-to-real loop: Adapting simulation randomization with real world experience. arXiv preprint arXiv:1810.05687, 2018.
A. Dosovitskiy, G. Ros, F. Codevilla, A. Lopez, and V. Koltun. CARLA: An open urban driving simulator. In CORL, pp. 1-16, 2017.
G. K. Dziugaite, D. M. Roy, and Z. Ghahramani. Training generative neural networks via maximum mean discrepancy optimization. In UAI, 2015.
G. French, M. Mackiewicz, and M. Fisher. Self-ensembling for visual domain adaptation. In ICLR, 2018.
A. Gaidon, Q. Wang, Y. Cabon, and E. Vig. Virtual worlds as proxy for multi-object tracking analysis. In CVPR, 2016.
Y. Ganin, T. Kulkarni, I. Babuschkin, S. Eslami, and O. Vinyals. Synthesizing programs for images using reinforced adversarial learning. arXiv preprint arXiv:1804.01118, 2018.
A. Geiger, P. Lenz, and R. Urtasun. Are we ready for Autonomous Driving? The KITTI Vision Benchmark Suite. In CVPR, 2012.
I. Goodfellow, J. Pouget-Abadie, M. Mirza, B. Xu, D.Warde-Farley, S. Ozair, A. Courville, and Y. Bengio. Generative adversarial nets. In NIPS, 2014.
E. Greensmith, P. L. Bartlett, and J. Baxter. Variance reduction techniques for gradient estimates in reinforcement learning. JMLR, 5(Nov.):1471-1530, 2004.
A. Gretton, K. M. Borgwardt, M. J. Rasch, B. Schölkopf, and A. Smola. A kernel two-sample test. JMLR, 2012.

(56) References Cited

OTHER PUBLICATIONS

K. He, G. Gkioxari, P. Doll'ar, and R. Girshick. Mask r-cnn. In Proceedings of the IEEE international conference on computer vision, pp. 2961-2969, 2017.
J. Hoffman, E. Tzeng, T. Park, J.-Y. Zhu, P. Isol, K. S. A. A. Efros, and T. Darrell. Cycada: Cycle-consistent adversarial domain adaptation. In ICML, 2018.
X. Huang, M.-Y. Liu, S. Belongie, and J. Kautz. Multimodal unsupervised image-to-image translation. In ECCV, 2018.
T. Karras, S. Laine, and T. Aila. A style-based generator architecture for generative adversarial networks. arXiv preprint arXiv:1812. 04948, 2018.
H. Kato, Y. Ushiku, and T. Harada. Neural 3d mesh renderer. In CVPR, 2018.
T. N. Kipf and M. Welling. Semi-supervised classification with graph convolutional networks. In ICLR, 2017.
E. Kolve, R. Mottaghi, D. Gordon, Y. Zhu, A. Gupta, and A. Farhadi. Ai2-thor: An interactive 3d environment for visual ai. In arXiv:1712.05474, 2017.
T. D. Kulkarni, P. Kohli, J. B. Tenenbaum, and V. Mansinghka. Picture: A probabilistic programming language for scene perception. In Proceedings of the IEEE conference on computer vision and pattern recognition, pp. 4390-4399, 2015.
Y. LeCun. The MNIST database of handwritten digits, http://yann.lecun.com/exdb/mnist/.
C.-L. Li, W.-C. Chang, Y. Cheng, Y. Yang, and B. Póczos. Mmd gan: Towards deeper understanding of moment matching network. In NIPS, 2017.
P. Li, X. Liang, D. Jia, and E. P. Xing. Semantic-aware gradgan for virtual-to-real urban scene adaption. In BMVC, 2018.
T.-M. Li, M. Aittala, F. Durand, and J. Lehtinen. Differentiable Monte Carlo ray tracing through edge sampling. ACM Trans. Graph. (Proc. SIGGRAPH Asia), 2018.
Y. Li, K. Swersky, and R. Zemel. Generative moment matching networks. In ICML, 2015.
M.-Y. Liu, T. Breuel, and J. Kautz. Unsupervised image-to-image translation networks. In NIPS, 2017.
G. Louppe and K. Cranmer. Adversarial variational optimization of non-differentiable simulators. arXiv preprint arXiv:1707.07113, 2017.
V. K. Mansinghka, T. D. Kulkarni, Y. N. Perov, and J. Tenenbaum. Approximate Bayesian image interpretation using generative probabilistic graphics programs. In Advances in Neural Information Processing Systems, pp. 1520-1528, 2013.
A. Prakash, S. Boochoon, M. Brophy, D. Acuna, E. Cameracci, G. State, O. Shapira, and S. Birchfield. Structured domain randomization: Bridging the reality gap by context-aware synthetic data. In arXiv:1810.10093, 2018.
X. Puig, K. Ra, M. Boben, J. Li, T. Wang, S. Fidler, and A. Torralba. Virtualhome: Simulating household activities via programs. In CVPR, 2018.
S. R. Richter, V. Vineet, S. Roth, and V. Koltun. Playing for data: Ground truth from computer games. In ECCV, 2016.
O. Ronneberger, P. Fischer, and T. Brox. U-net: Convolutional networks for biomedical image segmentation. In MICCAI, pp. 234-241. Springer, 2015.
G. Ros, L. Sellart, J. Materzynska, D. Vazquez, and A. Lopez. The SYNTHIA Dataset: A large collection of synthetic images for semantic segmentation of urban scenes. In CVPR, 2016.
N. Ruiz, S. Schulter, and M. Chandraker. Learning to simulate. arXiv preprint arXiv:1810.02513, 2018.
F. Sadeghi and S. Levine. Cad2rl: Real single-image flight without a single real image. arXiv preprint arXiv:1611.04201, 2016.
S. Shah, D. Dey, C. Lovett, and A. Kapoor. Aerial Informatics and Robotics platform. Technical Report MSR-TR-2017-9, Microsoft Research, 2017.
C. Szegedy, V. Vanhoucke, S. Ioffe, J. Shlens, and Z. Wojna. Rethinking the inception architecture for computer vision. In CVPR, 2016.
J. Tobin, R. Fong, A. Ray, J. Schneider, W. Zaremba, and P. Abbeel. Domain randomization for transferring deep neural networks from simulation to the real world. In IROS, 2017.
E. Todorov, T. Erez, and Y. Tassa. Mujoco: A physics engine for model-based control. In Intl. Conf. on Intelligent Robots and Systems, 2012.
Y.-H. Tsai, W.-C. Hung, S. Schulter, K. Sohn, M.-H. Yang, and M. Chandraker. Learning to adapt structured output space for semantic segmentation. In CVPR, 2018.
M. Wrenninge and J. Unger. Synscapes: A photorealistic synthetic dataset for street scene parsing. In arXiv:1810.08705, 2018.
Y. Wu, Y. Wu, G. Gkioxari, and Y. Tiani. Building generalizable agents with a realistic and rich 3d environment. In arXiv:1801. 02209, 2018.
T. Yao, Y. Pan, Y. Li, and T. Mei. Exploring visual relationship for image captioning. In Proceedings of the European Conference on Computer Vision (ECCV), pp. 684-699, 2018.
J.-Y. Zhu, T. Park, P. Isola, and A. A. Efros. Unpaired image-to-image translation using cycle-consistent adversarial networks. In ICCV, 2017.
S.-C. Zhu, D. Mumford, et al. A stochastic grammar of images. Foundations and Trends® in Computer Graphics and Vision, 2(4):259-362, 2007.
B. Zoph and Q. V. Le. Neural architecture search with reinforcement learning. In ICLR, 2017.
Y. Zou, Z. Yu, B. V. K. V. Kumar, and J. Wang. Domain adaptation for semantic segmentation via class-balanced self-training. In ECCV, 2018.
International Search Report and Written Opinion dated Apr. 15, 2020 in Application No. PCT/US2019/061820 filed Nov. 15, 2019.
International Preliminary Report on Patentability received for PCT Application No. PCT/US2019/061820, dated May 27, 2021, 9 pages.
Asvadi, A., et al.,"DepthCN: Vehicle detection using 3D-LIDAR and ConvNet", IEEE 20th International Conference On Intelligent Transportation Systems (ITSC), pp. 1-6 (2017).
Bach, M., et al., "Multi-Camera Traffic Light Recognition Using A Classifying Labelled Multi-Bernoulli Filter", In 2017 IEEE Intelligent Vehicles Symposium (IV), pp. 1045-1051 (Jun. 11-14, 2017).
Bidlack, C. et al., "Visual Robot Navigation Using Flat Earth Obstacle Projection", Proceedings Of The IEEE International Conference On Robotics And Automation, pp. 3374-3381 (May 8, 1994).
Bojarski, M., et al.,"End To End Learning For Self-Driving Cars", arXiv: 1604.07316v1 [cs.CV], XP055570062, Retrieved from the Internet URL:https://nvidia.com/content/tegra/automotive/images/2016/solutions/pdf/end-to-end-dl-using-px.pdf, pp. 1-9 (Apr. 25, 2016).
Garnett, N., et al., "Real-Time Category-Based and General Obstacle Detection for Autonomous Driving", IEEE International Conference on Computer Vision Workshops (ICCVW), IEEE, pp. 198-205 (2017).
Godard, C., et al. ,"Unsupervised Monocular Depth Estimation with Left-Right Consistency", IEEE Computer Society Conference on Computer Vision and Pattern Recognition, pp. 270-279 (Jul. 21, 2017).
He, L., et al., "Learning Depth from Single Images with Deep Neural Network Embedding Focal Length", arXiv:1803.10039v1 [cs.CV], pp. 1-14 (Mar. 27, 2018).
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
Jayaraman, A. et al., "Creating 3D Virtual Driving Environments for Simulation-Aided Development of Autonomous Driving and Active Safety", SAE Technical Paper Series, vol. 1, pp. 1-6 (Mar. 28, 2017).
Kendall, A., et al.,"End-to-end Learning of Geometry and Context for Deep Stereo Regression", pp. 66-75 (Mar. 13, 2017).

(56) References Cited

OTHER PUBLICATIONS

Kim, W.S., et al.,"Depth map coding with distortion estimation of rendered view", Proceedings Of SPIE, vol. 7543, Visual Information Processing and Communication, 75430B, pp. 1-11 (Jan. 17, 2010); doi: 10.1117/12.839030.

Kipf, T. N. and Welling, M., "Variational Graph Auto-Encoders", Bayesian Deep Learning Workshop (NIPS 2016), pp. 1-3 (Nov. 21, 2016).

Li, Y., et al., "Learning Deep Generative Models of Graphs", Machine Learning, pp. 1-21 (Mar. 8, 2018).

Liu, H. et al., "Neural Person Search Machines", IEEE International Conference On Computer Vision (ICCV), pp. 493-501 (2017).

Liu, T., et al.,"Creating consistent scene graphs using a probabilistic grammar", ACM Transactions on Graphics, vol. 33, No. 6, pp. 1-12 (2014).

Liu, W., et al., "SSD: Single Shot MultiBox Detector", European Conference on Computer Vision, pp. 21-37 (2016).

Neven, D., et al.,"Towards End-to-End Lane Detection: an Instance Segmentation Approach", arXiv:1802.05591v1 [cs.CV], pp. 1-7 (Feb. 15, 2018) XP055590532, Retrieved from the Internet: URL:https://arxiv.org/pdf/1802.05591.pdf.

Pang, J., et al., "Cascade Residual Learning: A Two-Stage Convolutional Neural Network for Stereo Matching", IEEE International Conference on Computer Vision Workshops (ICCVW), pp. 887-895 (Oct. 22, 2017).

Reiners, D., "OpenSG: A Scene Graph System for Flexible and Efficient Realtime Rendering for Virtual and Augmented Reality Applications", PhD thesis, Technical University Darmstadt, pp. 1-131 (2002).

Rothe, R., et al., "Non-Maximum Suppression For Object Detection By Passing Messages Between Windows", In Asian Conference On Computer Vision, pp. 1-17 (2015).

Stein, G. P., et al.,"Vision-Based ACC With A Single Camera: Bounds On Range And Range Rate Accuracy", Proceedings Of IEEE Intelligent Vehicle Symposium, pp. 1-6 (2003).

Suorsa, R. E., et al.,"A Parallel Implementation of A Multisensor Feature-Based Range-Estimation Method", IEEE Transactions On Robotics And Automation, vol. 10, Issue 6, pp. 1-34 (1994).

Tao, A., et al.,"Detectnet: Deep Neural Network For Object Detection In Digits", accessed at : https://devblogs.nvidia.com/detectnet-deep-neural-network-object-detection-digits/, Accessed on Jul. 22, 2019 , pp. 1-9.

Tateno, K. et al.,"CNN-SLAM: Real-time dense monocular SLAM with learned depth prediction", pp. 6243-6252 (2017).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

Weber, M., et al., "Deeptlr: A Single Deep Convolutional Network For Detection And Classification Of Traffic Lights", In IEEE Intelligent Vehicles Symposium (IV), pp. 1-7 (Jun. 2016).

You, J., et al., "GraphRNN: Generating Realistic Graphs with Deep Auto-regressive Models", International Conference on Machine Learning, pp. 1-12 (2018).

Zhong, Y., et al., "Self-Supervised Learning for Stereo Matching With Self-Improving Ability", arXiv:1709.00930v1 [cs.CV], pp. 1-13 (Sep. 4, 2017).

International Search Report and Written Opinion received for PCT Patent Application No. PCT/US2019/024400, dated Jun. 26, 2019, 11 pages.

International Search Report and Written Opinion dated Jul. 25, 2019 in International Patent Application No. PCT/US2019/018348, 21 pages.

International Search Report and Written Opinion dated Aug. 26, 2019 in International Patent Application No. PCT/US2019/022592, 14 pages.

International Search Report and Written Opinion received for PCT Patent Application No. PCT/US2019/012535, dated Oct. 17, 2019, 20 pages.

International Search Report and Written Opinion dated Nov. 7, 2019 in International Patent Application No. PCT/US2019/022753, 18 Pages.

International Preliminary Report on Patentability received for PCT Application No. PCT/US2019/012535, dated Jul. 16, 2020, 16 pages.

International Preliminary Report on Patentability received for PCT Application No. PCT/US2019/016418, dated Aug. 13, 2020, 8 pages.

International Preliminary Report on Patentability received for PCT Application No. PCT/US2019/018348, dated Aug. 27, 2020, 16 pages.

International Preliminary Report on Patentability received for PCT Application No. PCT/US2019/019656, dated Sep. 3, 2020, 11 pages.

International Preliminary Report on Patentability received for PCT Application No. PCT/US2019/022753, dated Oct. 1, 2020, 14 pages.

International Preliminary Report on Patentability received for PCT Application No. PCT/US2019/024400, dated Oct. 8, 2020, 10 pages.

International Preliminary Report on Patentability received for PCT Application No. PCT/US2019/068766, dated Jul. 8, 2021, 10 pages.

International Preliminary Report on Patentability received for PCT Application No. PCT/US2019/068764, dated Jul. 8, 2021, 12 pages.

Non-final office action dated Oct. 7, 2021 in U.S. Appl. No. 16/366,875, 22 pages.

Final office action dated Feb. 8, 2022 in U.S. Appl. No. 16/366,875, 20 pages.

Notice of Allowance dated Apr. 22, 2022, in U.S. Appl. No. 16/366,875, 16 pages.

"Systems and Methods for Safe and Reliable Autonomous Vehicles", U.S. Appl. No. 62/584,549, filed Nov. 10, 2017.

* cited by examiner

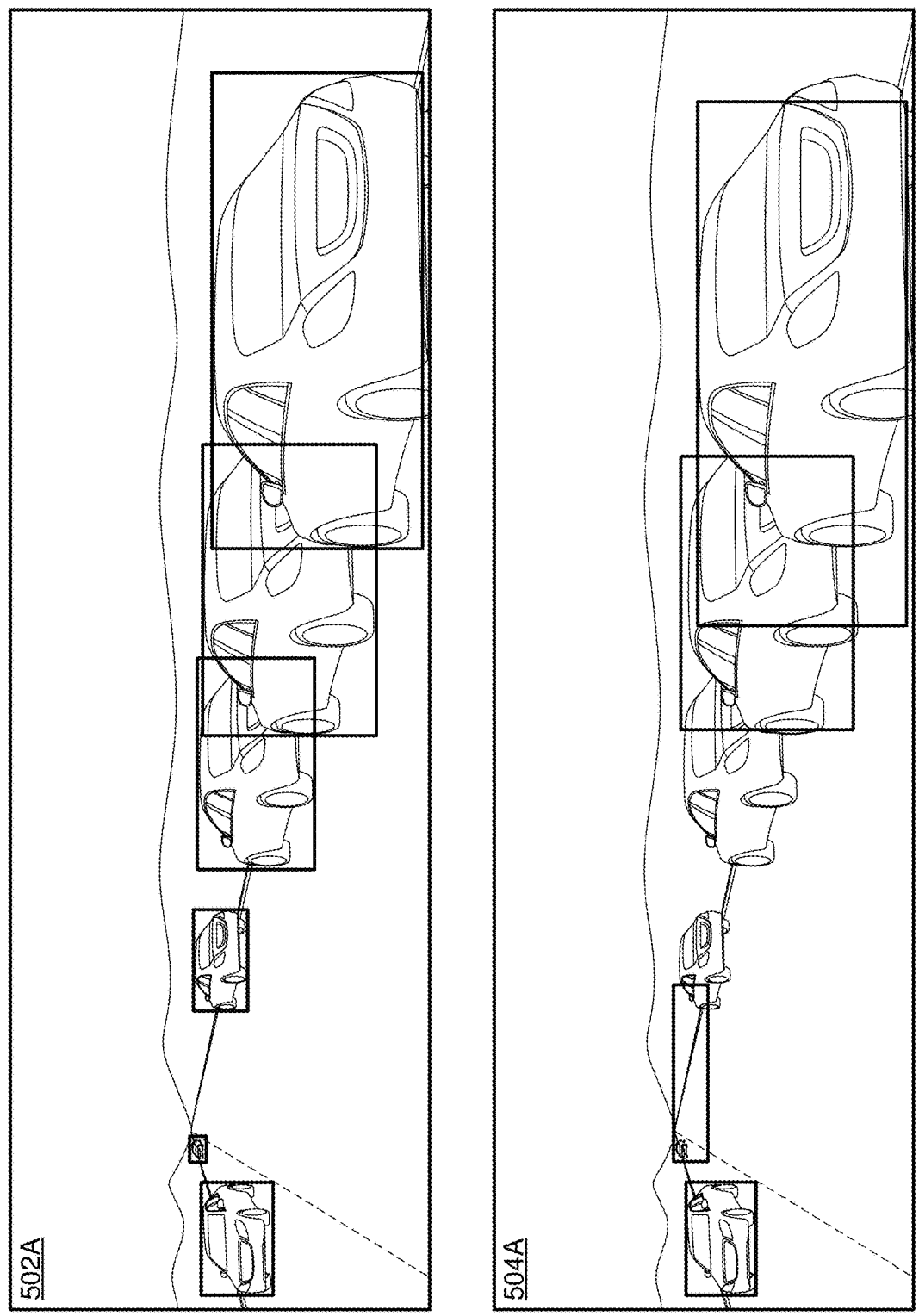

LEARNING TO GENERATE SYNTHETIC DATASETS FOR TRAINING NEURAL NETWORKS

CROSS-REFERENCE TO RELATED APPLICATIONS

This application claims the benefit of U.S. Provisional Application No. 62/827,313, filed on Apr. 1, 2019, and U.S. Provisional Application No. 62/768,846, filed on Nov. 16, 2018, which are hereby incorporated by reference in their entirety.

This application is related to U.S. Non-Provisional application Ser. No. 16/366,875, filed on Mar. 27, 2019, which is hereby incorporated by reference in its entirety.

BACKGROUND

Data collection and labeling is a laborious, costly, and time consuming task that requires countless human and compute resources. However, machine learning models—such as neural networks—require large amounts of data and corresponding ground truth information for effective training prior to deployment. As a result, the data collection and labeling portion of model training presents a significant bottleneck in most machine learning pipelines.

To combat this issue, synthetic data generation has emerged as a solution to generate ground truth information in greater volumes—e.g., using a graphics engine. Some conventional methods for synthetic data creation require qualified experts to create virtual worlds from which synthetic data is sampled. However, the process of creating virtual worlds manually is an equally laborious task as manual labeling of real-world data. In lieu of creating virtual worlds in this way, some conventional approaches use domain randomization (DR) as a cheaper alternative to photo-realistic environment simulation. DR techniques generate a large amount of diverse scenes by inserting objects into environments in random locations and poses—however, this randomness often results in creating an environment that is very different from—and not optimal as—a proxy for real-world scenes.

Other conventional approaches aim to address a domain gap between synthetic and real-world environments, such as to generate synthetic data that more closely approximates real-world appearance than existing solutions. Such approaches use generative adversarial networks (GANs) to transform the appearance of synthetic data to more closely resemble real-world data—yet these methods still fail to cure the deficiency of the synthetic environments matching the real-world environments. For example, attributes of objects in the simulated environment—such as location, pose, color, texture, shape, size, etc.—do not reflect the attributes of similar objects in real-world environments.

SUMMARY

Embodiments of the present disclosure relate to generating synthetic datasets for training neural networks. Systems and methods are disclosed that use a generative model—such as a graph convolutional network (GCN)—to transform initial scene graphs sampled from a scene grammar into transformed scene graphs having updated attributes with respect to attributes of the initial scene graphs.

The generative model may be trained to compute the transformed scene graphs such that distributions of corresponding attributes more closely reflect distributions of real-world environments or scenes. In addition, synthetic datasets and corresponding ground truth generated using the transformed scene graphs may be used to train a downstream task network, and the performance of the downstream task network on real-world validation datasets may be leveraged to further train and fine-tune the generative model. As a result, the generative model may not only predict transformed scene graphs that may be used to render more synthetic datasets, but the synthetic datasets may also be tuned for more effectively training a downstream task network for its corresponding task.

The generative model therefore serves as an aid in bridging the content gap that previously existed between synthetic data and real-world data. As a result, and as a non-limiting example, where conventional approaches may generate a synthetic scene including photo-realistic vehicles, pedestrians, buildings, and/or other objects distributed in an unrealistic manner (e.g., vehicles facing perpendicular to a direction of travel on a road, sidewalks wider than in a real-world environment, pedestrians too close together, etc.), the techniques of the present disclosure allow for these synthetic scenes to not only include photo-realistic renderings, but also to include distributions of objects in a more realistic, real-world analogous manner. Thus, in addition to bridging the domain gap that has been a focus of prior approaches, the current approach also bridges the content gap, therefore resulting in photo-realistic environments that mimic real-world scenes with an accuracy that enables downstream task networks to be trained on these synthetic datasets while being deployed for use in real-world applications using real-world data.

BRIEF DESCRIPTION OF THE DRAWINGS

The present systems and methods for learning to generate synthetic datasets for training neural networks are described in detail below with reference to the attached drawing figures, wherein:

FIGS. 5A-5B are example illustrations of downstream task network performance when using synthetic datasets generated by a distribution transformer model as compared to a baseline model, in accordance with some embodiments of the present disclosure;

DETAILED DESCRIPTION

Systems and methods are disclosed related generating synthetic datasets for training neural networks. These systems and methods may be useful for a variety of implementations including, but not limited to, autonomous vehicle control and navigation (e.g., with respect to autonomous or semi-autonomous vehicles, water vessels or water craft, drones, aircraft, emergency vehicles, construction equipment, and/or other autonomous or semi-autonomous vehicle types), generation of simulated environments for testing (e.g., testing robots, drones, autonomous vehicles, etc.), gaming, and/or indoor navigation, optical flow estimation, drone or quadcopter control and navigation, among others. For example, the systems and methods described herein may be useful for generating synthetic datasets for use in training neural networks included in an autonomous driving software stack, a robotics software stack, a drone or quadcopter software stack, and/or the like. As another example, the systems and methods described herein may be useful for generating simulated environments that more closely resemble real-world environments in order to test or train vehicles (e.g., human-controlled, autonomous, semi-autonomous, etc.), robots, drones, humans (e.g., for real-world scenarios, such as combat, operating machinery, etc.), and/or the like. In some non-limiting embodiments, some or all of the components, features, and functionality described herein with respect to example computing device 800 of FIG. 8 may be used to perform some or all of process 100 (FIG. 1) and process 200 (FIGS. 2A-2C).

Figure 1:
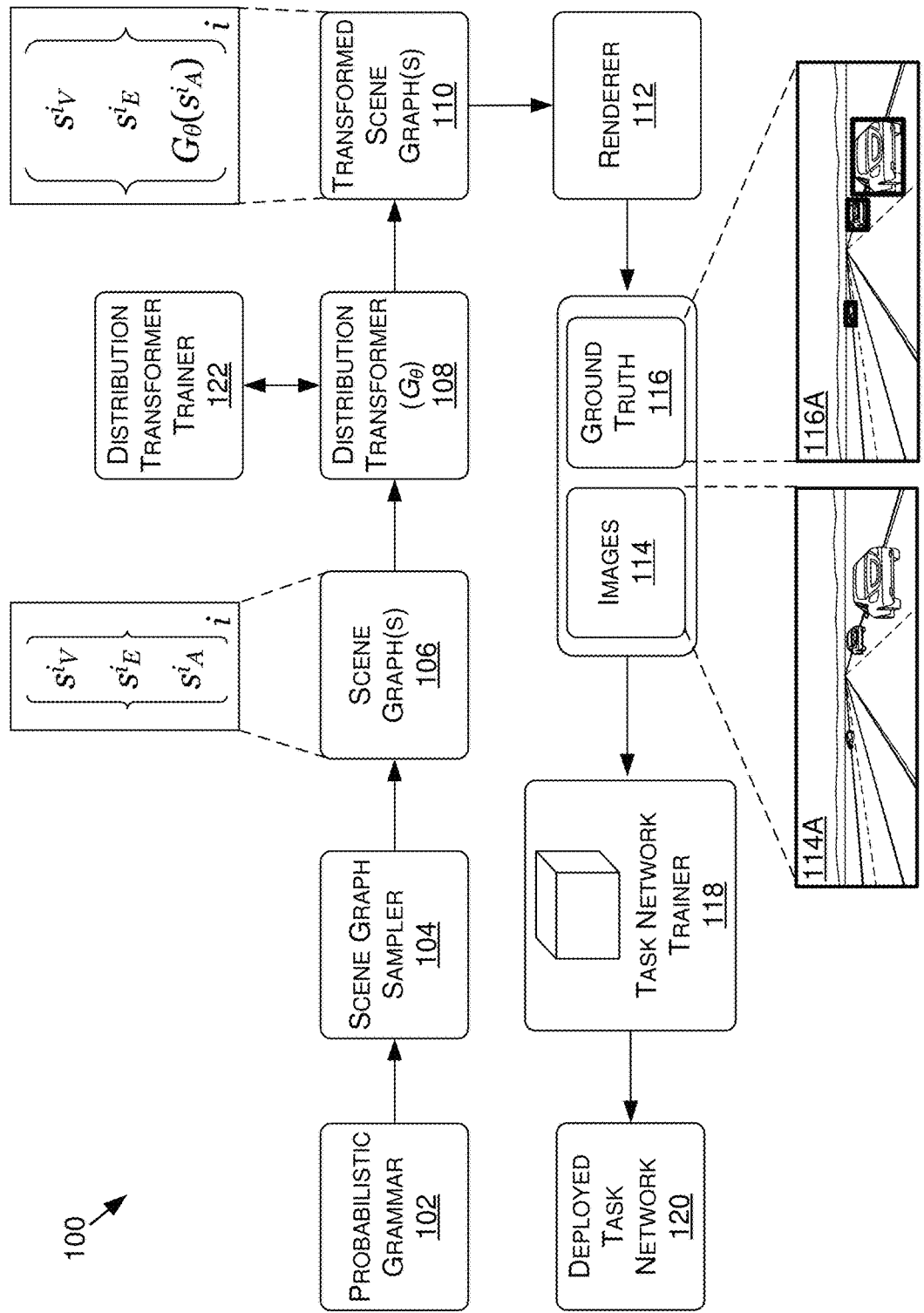
FIG. 1 is a data flow diagram illustrating a process for training a distribution transformer model to generate synthetic datasets for use in training downstream task networks, in accordance with some embodiments of the present disclosure.
Figure 2A:
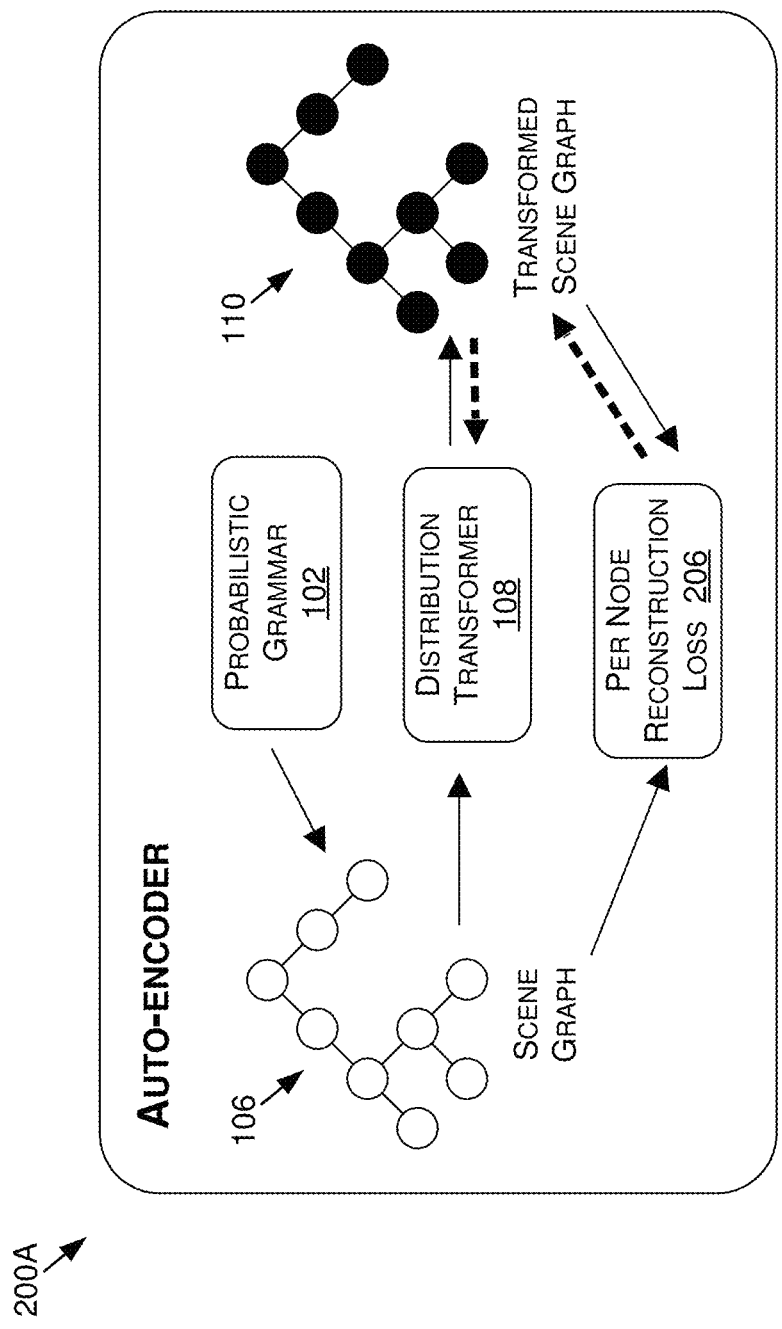
FIG. 2A is an example illustration of a process for pre-training a distribution transformer model, in accordance with some embodiments of the present disclosure.
Figure 2B:
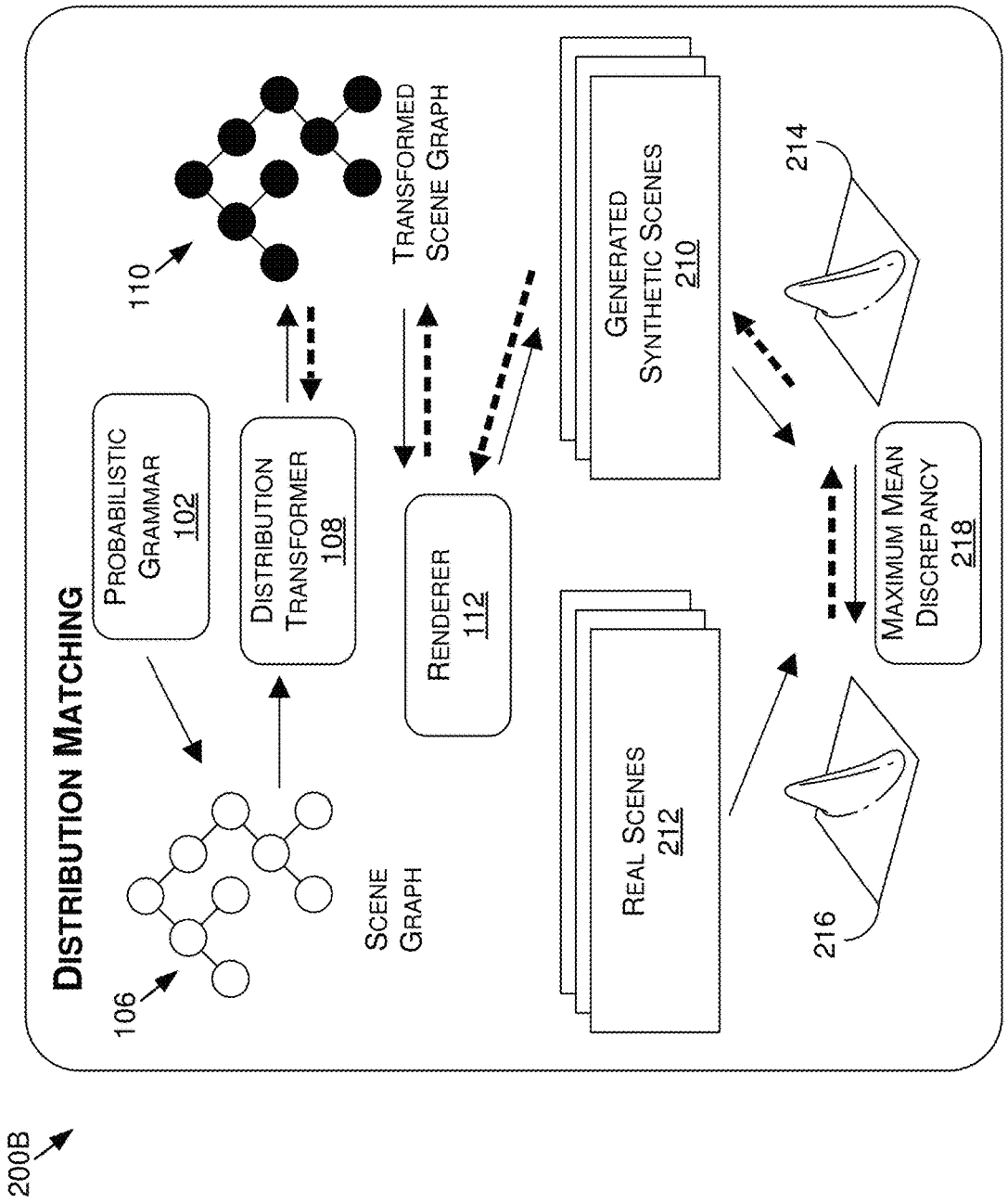
FIG. 2B is an example illustration of a process for training a distribution transformer model using discrepancies between distributions of real-world data and synthetic data, in accordance with some embodiments of the present disclosure.
Figure 2C:
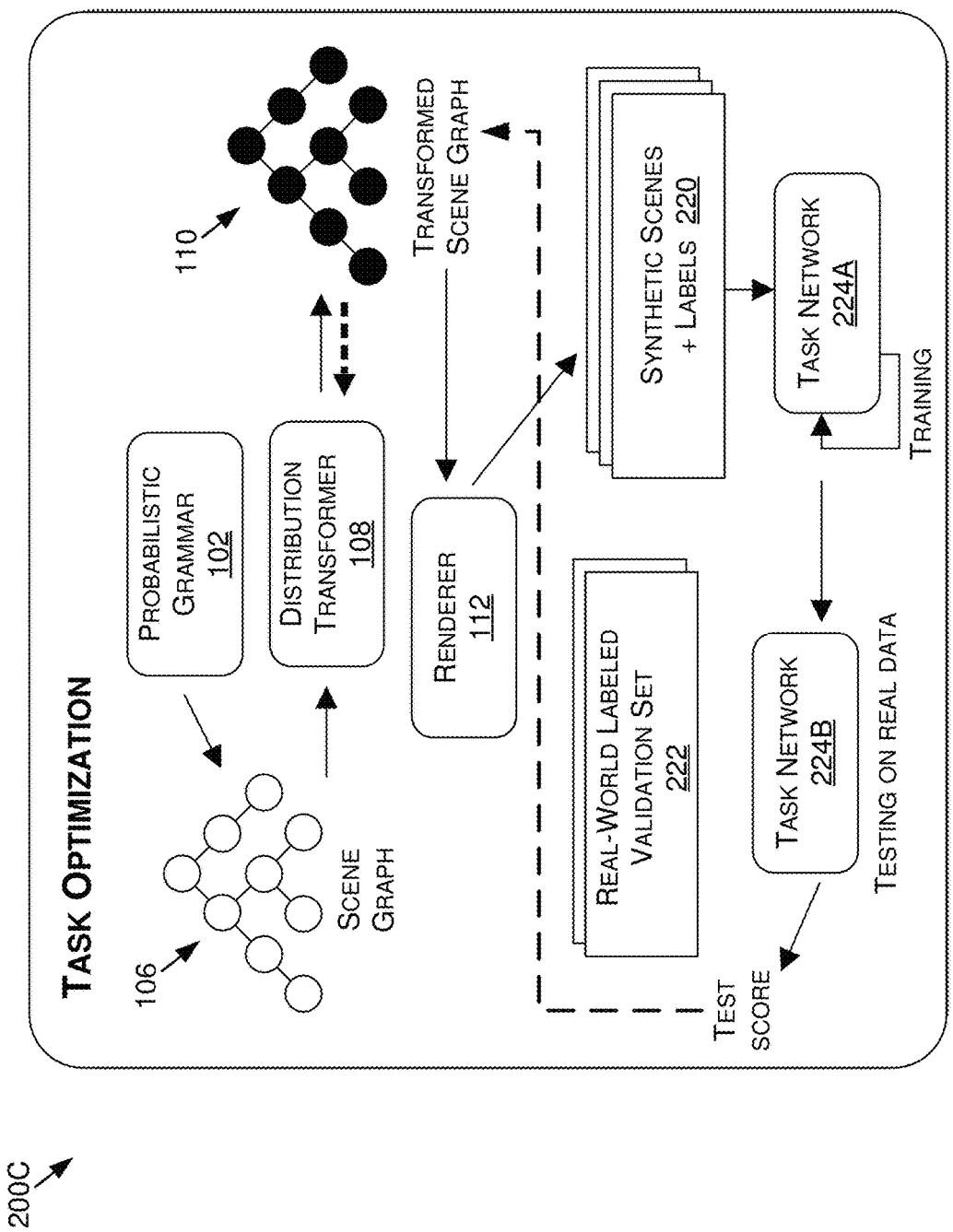
FIG. 2C is an example illustration of a process for training a distribution transformer model for computing transformed scene graphs fine-tuned for a task of a downstream task network, in accordance with some embodiments of the present disclosure.

Now referring to FIG. 1, FIG. 1 is a data flow diagram illustrating a process 100 for training a distribution transformer model to generate synthetic datasets for use in training downstream task networks, in accordance with some embodiments of the present disclosure. For example, given a dataset of real imagery, $X_R$, and a task, T (e.g., object detection, lane classification, etc.), the process 100 may be used to synthesize a training dataset, $D_T=(X_T, Y_T)$, with synthesized imagery, $X_T$, and corresponding ground truth, $Y_T$. In addition, where a validation set, $V_T$, of real-world data is labeled for a specific task, T, the process 100 may additionally optimize or tune a distribution transformer 108 for a meta-objective—e.g., downstream performance of the specific task, T. As a result, the process 100 may be used to not only train the distribution transformer 108 to generate a synthesized dataset (e.g., images 114 and corresponding ground truth 116) of scenes that more closely resemble real-world scenes, but the process 100 may also be used to fine-tune the generation of the synthesized dataset for a particular downstream task (e.g., a task of a deployed task network 120).

The process 100 may include a scene grammar—such as probabilistic grammar 102—that may define rules, such as a topology, probabilistic parameters, and/or distributions (e.g., attribute distributions) corresponding to objects and features of a scene, for generating scene graphs that define scene instances. For example, the probabilistic grammar 102 may define a set of scenes and a probability distribution over the scenes. Each scene may be defined using a set of building blocks and a set of rules that define co-occurrences of a groups of objects. The building blocks and co-occurrences of objects may then be combined together to form a larger set of possible structures and/or compositions of scenes that may be governed by the rules. Scenes represented by the scene grammar may capture the presence of different objects and features in an environment, as well as relationships between and among the different objects and features. For example, the probabilistic grammar 102 may define a set of possible scenes and a probability distribution over the scenes—each scene being defined by a set of blocks that are connected together using a set of rules.

Each instance of a scene sampled (e.g., by scene graph sampler 104) from the scene grammar—e.g., the probabilistic grammar 102—may be represented as a scene graph 106. Each scene graph 106 may represent elements (e.g., objects, and features or components thereof) of a scene in a concise hierarchical structure, with each element having a set of attributes—e.g., class, location, color, pose, dimensions, texture, asset identifier, etc. The hierarchy may define parent-child dependencies, where the attributes of child elements may be defined relative to the parent's, thus allowing for an efficient and natural way to create and modify scenes. Corresponding synthetic images (e.g., images 114) and pixel level annotations (e.g., ground truth 116) may be rendered easily by placing objects or elements as described in the scene graph 106.

The probabilistic grammar 102, P, may define a generative process for generating the scene graphs 106, S, when sampled by the scene graph sampler 104. For a non-limiting example, to generate a traffic scene, a centerline of a road may be defined, followed by parallel lines, then vehicles positioned within lanes, etc. The structure of the scene may be defined by the probabilistic grammar 102, while the attributes corresponding to each of the objects or features may be sampled from parametric distributions—which require careful tuning to be accurate. As such, using the scene graphs 106 sampled from the probabilistic grammar 102 to generate the images 114 and ground truth 116 for training downstream task networks does not generate as accurate results as using the transformed scene graphs 110, described herein. This may be a result of the requirement that the attribute distributions be fine-tuned, which is a difficult, time-consuming, and generally inaccurate venture leading to scenes sampled from the probabilistic grammar 102 that do not closely resemble real-world scenes and environments.

To remedy this drawback, the process 100 may implement a distribution transformer 108, $G_\theta$, that may be trained to update or transform attributes, $S_A$ (corresponding to the scene graphs 106, S) to updated attributes ($G_\theta(S_A)$, corresponding to transformed scene graphs 110). In some embodiments, it may be assumed that the structure of the scene graphs 106 is correct (e.g., a driving scene has a road, a sky, a number of objects, etc.). As such, the transformed scene graphs 110 may include a substantially identical structure (e.g., vertices, $S_V$, and edges, $S_E$, may remain the same) but with transformed or updated attributes, $S_A \rightarrow G_\theta(S_A)$. By maintaining the structure, but modifying the attributes, renderings of the transformed scene graphs 110 more closely resemble real-world scenes. This process may amount to learning a generative model that has the flexibility to change objects attributes (e.g., color, pose, texture, location, size, etc.). In essence, the structure generated from the probabilistic grammar 102 is maintained, while the distribution of the attributes is transformed, thus acting as a distribution transformer 108. Equation (1) below expresses the transformation of the scene graphs 106 to the transformed scene graphs 110 when the distribution transformer, $G_\theta$, is applied:

$$G_\theta[S_V, S_E, S_A] = [S_V, S_E, G_\theta(S_A)] \quad (1)$$

The distribution transformer 108, $G_\theta$, may include, in some non-limiting embodiments and due to the graphical structure of the scene graphs 106, a convolutional neural network (CNN)—such as graph convolutional network (GCN). For a non-limiting example, where the distribution transformer 108 is a GCN, the GCN may use two different weight matrices to capture top-down and bottom-up information flow separately. In some embodiments, the distribution transformer 108 may make per node predictions, meaning that the distribution transformer 108 may generate transformed attributes, $G_\theta(S_A)$, for each node in $S_V$.

In some non-limiting embodiments, although all attributes, $S_A$, may be provided as input to the distribution transformer 108, there may be only a subset of the attributes that are to be modified. For example, a first subset of the attributes (e.g., mutable or modifiable attributes) may be identified (e.g., selected, learned, etc.) for modification while a second subset of the attributes (e.g., immutable or fixed attributes) may be identified (e.g., selected, learned, etc.) as fixed. The second set of attributes, in such examples, may be trusted from the scene graph 106 as sampled from the probabilistic grammar 102. As an example, with respect to a street scene, the height of houses or width of sidewalks may not need to be changed when the scene is being used for detecting vehicles. As such, these attributes (e.g., height, width) may be immutable during this task, while attributes corresponding to the street or objects thereon may be mutable. As such, the first subset of attributes per node, $v \in S_V$, may be mutable, and may be denoted by $S_{A,mut}(v)$. By reducing the number of mutable attributes, $S_{A,mut}(v)$, the number of exposed parameters (e.g., weights, biases, etc.) the distribution transformer 108 is tasked to tune may be decreased—thereby improving training time and complexity as well as decreasing run time at inference.

Although examples are described herein with respect to using neural networks, and specifically GCNs, as the distribution transformer 108, this is not intended to be limiting. For example, and without limitation, the distribution transformer 108 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The distribution transformer 108 may be trained using a distribution transformer trainer 122, which is described in more detail herein with respect to FIGS. 2A-2C. The goal of the distribution transformer trainer 122 may be to update the parameters of the distribution transformer 108 in view of real-world data such that the attribute distribution corresponding to the transformed scene graphs 110 more closely resembles the attribute distributions of the real-world data. As a result, when the transformed scene graphs 110 are rendered by renderer 112, the rendered or synthetic scenes more closely reflect real-world scenes.

The renderer 112 may render the synthetic dataset, including the images 114 and the ground truth 116. The synthetic dataset may then be used to train a task network via a task network trainer 118. For example, assuming that a task of the task network is object detection, the transformed scene graphs may represent one or more objects such that the rendered images 114 (e.g., rendered image 114A) may depict the objects (e.g., the vehicles in the rendered image 114A). In addition, because the task may be object detection in this example, the ground truth 116 (e.g., the ground truth 116A) that may be determined—automatically, in embodiments—from the render information (e.g., the bounding shapes corresponding to the vehicles in the ground truth 116A).

Existing solutions to generating realistic high resolution images condition on input images and transform the appearance (e.g., to bridge the domain gap) of the input images. However, these methods assume that ground truth labels are unchanged, and thus are limited in their content (e.g., structural) variability. As such, conventional methods may not generate accurate ground truth information if the content (e.g., location, pose, size, color, etc., of objects) of the images is changed. However, in contrast, using the process 100 to generate a synthetic dataset, $D(\theta)$, from the transformed scene graphs 110 remedies this issue. For example, since the objects include associated semantic information (e.g., the system knows that an object is a car, or a pedestrian), compositing or modifying the synthetic scenes will still render perfect ground truth 116. As such, where prior approaches render an image using a scene graph, and then modify the appearance of the image, the process 100 modifies the scene graphs 106 via the distribution transformer 108 to generate the transformed scene graphs 110, and then renders the images 114 (e.g., using a graphics engine) from the modified scene graphs 110. As such, the ground truth 116 may be automatically generated from the images 114, using the image data representative thereof and/or the data representing the transformed scene graphs 110 (e.g., object types, locations, poses, attributes, etc.).

The task network trainer 118 may apply the image data representative of the images 114 to the task network, and the predictions of the task network may be compared against the ground truth 116. One or more loss functions may be used to train the task network using the ground truth 116 until the task network reaches optimal or threshold performance on the specific task. In some examples, the task network may be tested against real-world datasets to validate the performance of the task network after being trained using the synthetic dataset, $D(\theta)$. In addition, in some non-limiting embodiments, the task network may be used in a simulated or virtual environment (which may also be generated or rendered using the distribution transformer 108 and the transformed scene graphs 110, in embodiments) in order to test the performance of the task network prior to deploying the task network for use in a real-world environment. For example, the task network may be a part of an autonomous driving software stack—e.g., part of a perception layer of the stack, tasked with object detection. As such, a virtual or simulated vehicle may implement the autonomous driving software stack in a virtual environment, where the simulated vehicle may capture virtual image data (or other sensor data types) using virtual or simulated image sensors or cameras (or other sensor types). The virtual image data may then be applied to the task network to test the functionality of the task network within the autonomous driving stack in the virtual environment. The virtual environment may be similar to the virtual or simulated environments described in U.S. Non-Provisional application Ser. No. 16/366,875, filed on March 27, 2019, which is hereby incorporated by reference in its entirety.

Once the task network has been trained, tested, and validated using the task network trainer 118, the task network may be deployed as a deployed task network 120. For example, the deployed task network may be implemented into real-world systems, such as autonomous or semi-autonomous vehicles, robots, optical flow estimators, gaming systems, drones or quadcopters, etc. As a result, the deployed task network 120 may have been trained using synthetic datasets that more closely resemble real-world scenes, thereby removing—at least in part—the burden of capturing real-world data, manually labeling the real-world data for ground truth generation, and training the network on the real-world data and ground truth. The bottleneck, described herein, of the data collection and labeling portion of most machine learning pipelines may be removed, or decreased, resulting in expedited training of task networks without sacrificing accuracy or performance of the deployed task networks 120 when compared to conventional task networks trained on only real-world data.

Now referring to FIGS. 2A-2C, FIGS. 2A-2C describe a process 200 for training the distribution transformer 108 using the distribution transformer trainer 122. With respect to FIGS. 2A-2C, solid arrows may represent forward passes through the processes while dashed arrows may represent backward passes. For example, with respect to FIG. 2A, the transformed scene graph 110 may be used by per node reconstruction loss 206 as indicated by the solid arrow, and the per node reconstruction loss 206 may pass back information to the distribution transformer 108—e.g., via the transformed scene graph 110—for updating parameters of the distribution transformer 108, as indicated by the dashed arrows.

With reference to FIG. 2A, FIG. 2A is an example illustration of a process 200A for pre-training a distribution transformer model, in accordance with some embodiments of the present disclosure. The probabilistic grammar 102 may represent a prior probability distribution on how a scene or scene graph should be generated. As such, to pre-train the distribution transformer (e.g., to initialize parameters, such as weights and biases), the probabilistic grammar 102, P, may be used. This pre-training may include initializing the distribution transformer 108, $G(\theta)$, to perform an identify function such that $G(\theta)(S)=S$, where S is the scene graph 106 and $G(\theta)(S)$ is the transformed scene graph 110. The input feature of each node may be its attribute set, $S_A$, which may be defined consistently across all nodes. Since $S_A$ may be composed of different categorical and continuous components, appropriate losses may be used per feature component when training using per node reconstruction loss 206. For example, and without limitation, cross-entropy loss may be used for categorical attributes while L1 loss may be used for continuous attributes. Ultimately, using the auto-encoder process 200A may pre-train or initialize the distribution transformer 108 to generate transformed scene graphs 110 that are within a threshold similarity—e.g., are substantially identical—to the scene graphs 106 provided as input to the distribution transformer. Using the process 200A, the overall training and convergence time for the distribution transformer may be reduced as the initial parameters of the distribution transformer 108 may reflect the prior probability distribution that is the probabilistic grammar 102.

Now referring to FIG. 2B, FIG. 2B is an example illustration of a process 200B for training a distribution transformer model using discrepancies between distributions of real-world data and synthetic data, in accordance with some embodiments of the present disclosure. For example, a first objective of the distribution transformer 108 may be to bring the distributions of rendered synthetic images, $X_T$, closer to the distributions of real imagery, $X_R$ (e.g., to bring distributions 216 corresponding to real scenes 212 closer to distributions 214 of generated synthetic scenes 210). The process 200B may include sampling scene graphs 106 from the probabilistic grammar 102, applying data representative of the scene graphs 106 to the distribution transformer 108, predicting the transformed scene graphs 110 by distribution transformer, rendering the generated synthetic scenes 210 using the renderer 112 and based on the transformed scene graphs 110, and then sampling the distribution 214 and the distribution 216 to determine a discrepancy or difference. As a result, and as indicated by the backward propagating arrows, the discrepancy information may be used to then update the parameters of the distribution transformer 108 over many iterations until the distribution 214 and the distribution 216 are within a threshold similarity (e.g., such that the generated synthetic scenes 210 more closely resemble the real scenes 212).

In order to generate the distribution 214 and/or the distribution 216, the real scenes 212 and/or the generated synthetic scenes 210 (e.g., images representative thereof) may be applied to a feature extractor. The feature extractor may include a computer vision algorithm, a deep neural network trained for feature extraction, or another type of feature extractor algorithm. For example, and without limitation, the feature extractor may be a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models. The features computed by the feature extractor may be used to determine the distributions 214 and/or 216 (e.g., the information may be analyzed to determine, in a driving scene, locations, poses, colors, sizes, etc. of vehicles). In some embodiments, with respect to the distributions 214, the distributions 214 may be determined from the transformed scene graph 110 without requiring a feature extractor (e.g., the transformed scene graph may include semantic and/or other information indicating attributes of objects in the scenes 210). In other examples, a combination of a feature extractor, the transformed scene graphs 110, and/or another attribute determination method may be used to determine the distributions 214 corresponding to the generated synthetic scenes 210 and/or the real scenes 212.

The discrepancy or differences between the distributions 214 and 216 may be determined using any of a variety of methods. For example, in some non-limiting embodiments, maximum mean discrepancy (MMD) 218 may be used. MMD 218 is a frequentist measure of the similarity between distributions that may be used for training generative models—such as the distribution transformer 108—to match statistics of the generated distribution 214 with that of the target distribution 216. However, this is not intending to be limited, and other methods may be used, such as, without limitation, adversarial learning with discriminators. In some instances, pixel-wise generative models—such as the distribution transformer 108—using MMD 218 have suffered from not being able to effectively model high frequency signals, resulting in blurry data generations. However, since the processes 100 and 200 use the renderer 112, this issue is avoided altogether, thus allowing MMD 218 to be used for training stability.

In examples where MMD 218 is used, MMD 218 may be computed in the feature space using an image classification model and/or feature extractor model, as described herein, and denoted by $\phi$. In some non-limiting examples, kernel inception distance (KID) may be used to measure the dissimilarity between the distributions 214 and 216. A kernel trick may be used for the computation with a Gaussian kernel, $k(x_i, x_j)$.

With respect to FIG. 2B, distribution matching may be performed by, given scene graphs 106, $S_1, \ldots, S_N$, sampled from the probabilistic grammar 102 and target real images, $X_R$, the squared MMD 218 distance may be computed according to equation (2), below:

$$\mathcal{L}_{MMD^2} = \frac{1}{N^2} \sum_{i=1}^{N}\sum_{i'=1}^{N} k(\phi(X_\theta(S_i)), \phi(X_\theta(S_{i'}))) + \frac{1}{M^2}\sum_{j=1}^{N}\sum_{j'=1}^{N} k(\phi(X_R^j), \phi(X_R^{j'})) - \frac{1}{MN}\sum_{i=1}^{N}\sum_{j=1}^{M} k(\phi(X_\theta(S_i)), \phi(X_R^j)) \quad (2)$$

where an image rendered from S is $X_\theta(S)=R(G_\theta(S))$.

In order to sample from $G_\theta(S)$, the notation $R(G_\theta(S))$ may be overloaded, since R may actually require sampling from the prediction $G_\theta(S)$. Independence across scenes, nodes, and attributes—represented by the transformed scene graphs 110—may be assumed such that each attribute of each node in the transformed scene graphs 110 may be sampled independently. While training with MMD 218, the categorical attributes in $S_A$ may be marked or identified as immutable and the predicted continuous attributes may be directly passed as the sample.

In order to optimize the MMD loss, in some embodiments, the gradient may be back propagated through a non-differentiable rendering function, R (e.g., using the renderer 112). The gradient of $R(G_\theta(S))$ with respect to $G_\theta(S)$ may be approximated using the method of finite distances, for example. While this process may produce noisy gradients, it is sufficient for training models in practice with the added benefit of photo-realistic rendering. In some embodiments, differentiable rendering may be used to reduce the noisy gradients.

Now referring to FIG. 2C, FIG. 2C is an example illustration of a process 200C for training a distribution transformer model for computing transformed scene graphs fine-tuned for a task of a downstream task network, in accordance with some embodiments of the present disclosure. For example, a second objective of the distribution transformer 108 may be to generate data from the probabilistic grammar 102, P, such that a model trained on this data achieves best performance when tested on a target validation set of real-world data, V. This may be referred to as a meta-objective, where the input data may be optimized to improve accuracy on the validation set, V. This meta-objective may be tuned to a task network that is trained for a particular downstream task. As such, the distribution transformer 108, $G_\theta$, may be trained under the objective of equation (3), below:

$$\max_\theta \mathbb{E}_{S'\sim G_\theta(S)}[\text{score}(S')] \quad (3)$$

where score(S') is the performance metric or score achieved on validation data, V, after training a task network on data $R(G_\theta(S))$. The task loss in equation (3) may not be differentiable with respect to the parameters, $\theta$, since the score is measured using validation data and not S'. A reinforce score function estimator, or another unbiased estimator of the gradient, may be used to compute the gradients of equation (3). Reformulating the objective as a loss and writing the gradient yields equation (4), below:

$$\mathcal{L}_{task} = \mathbb{E}_{S'\sim G_\theta(S)}[\text{score}(S')]$$

$$\nabla_\theta \mathcal{L}_{task} = \mathbb{E}_{S'\sim G_\theta(S)}[\text{score}(S')\times\nabla_\theta \log p_{G_\theta}(S')] \quad (4)$$

To reduce the variance of the gradient from the estimator, an exponential moving average of previous scores may be tracked and subtracted from a current score. This expectation may be approximated using one sample from $G_\theta(S)$.

Equation (4), above, may require being able to sample and/or measure a likelihood from the distribution transformer 108. For continuous attributes, the distribution transformer 108 may be interpreted to be predicting the mean of a normal distribution per attribute, with a pre-defined variance. A re-parametrization trick to sample from the normal distribution may be used in some embodiments. For categorical attributes, it may be possible to sample from a multinomial distribution from the predicted log probabilities per category. As described herein, in some non-limiting embodiments, categorical attributes may be immutable.

In order to calculate log $p_{G_\theta}(S')$, independence across scenes, attributes, and objects in the scene may be assumed. As a result, the likelihood of equation (4) for a full scene may be simply factorizable, as seen in equation (5), below:

$$\log p_{G_\theta}(S') = \Sigma_{s'\in S}\Sigma_{v\in s'_V}\Sigma_{\alpha\in s'_{A,mut(v)}} \log p_{G_\theta}(s'(v,\alpha)) \quad (5)$$

Where $s'(v, \alpha)$ represents the attribute, $\alpha$, at node, $v$, in a single scene, $s'$, in batch, S'. Note that the sum is only over mutable attributes per node, $s_{A,mut}(v)$. The individual log probabilities may come from the defined sampling procedure, described herein.

FIG. 2C provides an overview of the process 200C, as described in more detail above. The scene graphs 106 may be sampled from the probabilistic grammar 102 and applied to the distribution transformer 108. The distribution transformer 108 may compute or predict the transformed scene graphs 110 which may be used by the renderer 112 to generate the synthetic scenes and labels 220 (e.g., the images 114 and the ground truth 116 of FIG. 1). A task network 224A (representing an untrained task network 224) may be trained using the synthetic dataset 220 (e.g., using the task network trainer 118 of FIG. 1). Once trained, or at least partially trained, the task network 224B (representing a partially trained or fully trained task network 224) may be tested on a real-world labeled validation set 222. The real-world labeled validation set 222 may include real world images representative of real-world scenes or environments and corresponding ground truth or validation labels. The performance of the task network 224B on the real-world labeled validation set 222 may be determined and represented using the score(S'), as described herein.

Figure 3A:
FIGS. 3A-3B are example illustrations of using real-world distributions and synthetic distributions to train a distribution transformer model to compute transformed scene graphs, in accordance with some embodiments of the present disclosure.
Figure 3B:
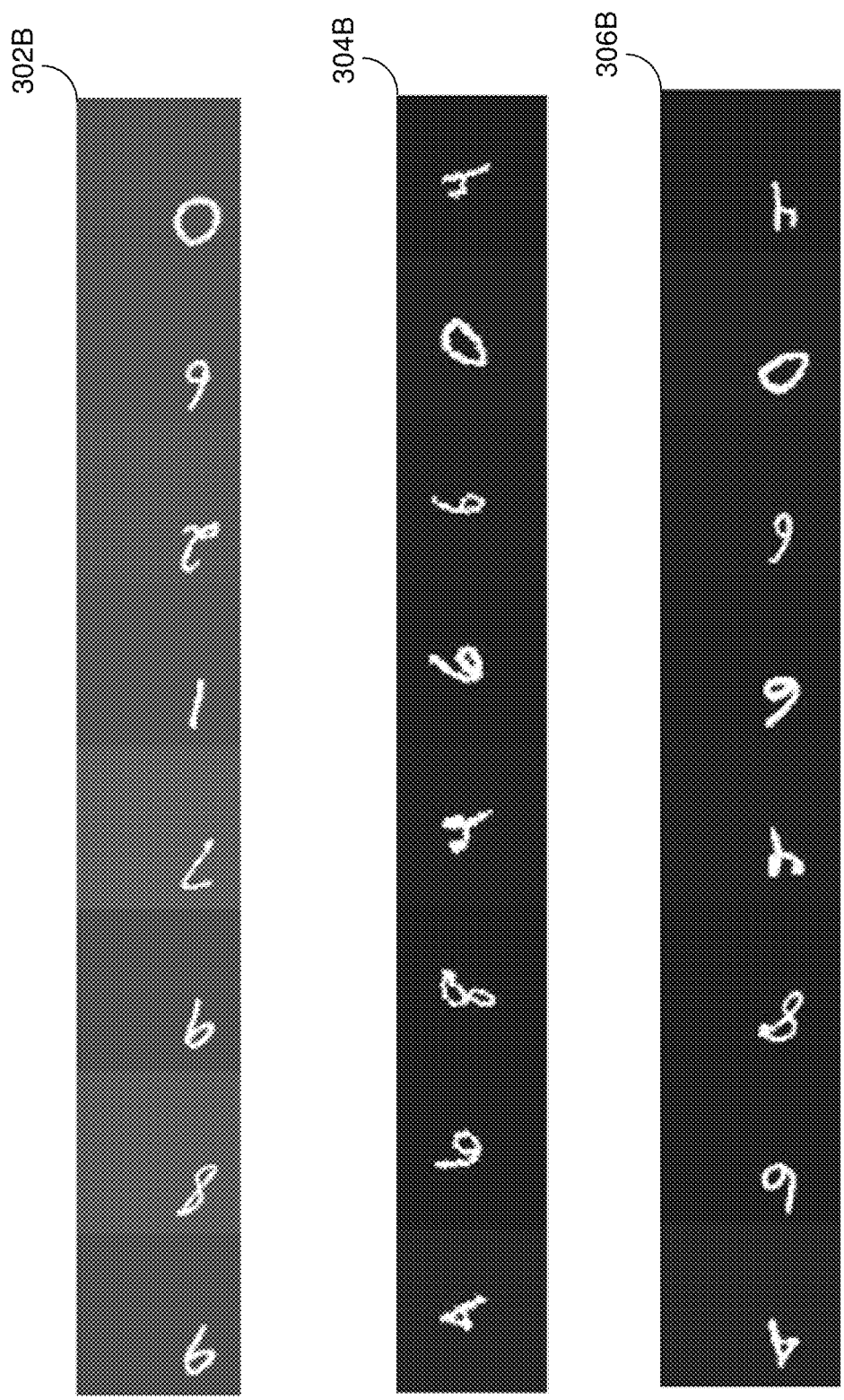

Now referring to FIGS. 3A-3B, FIGS. 3A-3B are example illustrations of using real-world distributions and synthetic distributions to train a distribution transformer model to compute transformed scene graphs, in accordance with some embodiments of the present disclosure. For example, FIGS. 3A and 3B represent digit classifications from the Modified National Institute of Standards and Technology (MNIST) database. The probabilistic grammar 102 samples a background texture, one digit texture (image) from the MNIST dataset (which has an equal probability for any digit), and then samples attributes for the digit—such as a rotation and location. The renderer 112 transforms the texture based on the sampled transformation and pastes it onto a canvas. The task network in this example is a small 2-layer CNN followed by three fully connected layers. A dropout in the fully connected layers (with 50, 100, and 10 features) may be applied. The task network, during this testing of the processes 100 and 200, achieved greater than 99% accuracy on the regular MNIST classification task.

In the example of FIG. 3A, the probabilistic grammar 102 generates input samples 304A, as represented by the scene graphs 106, that are upright and centered, like regular MNIST digits. The target data, V, and real images, $X_R$, are images 302A where digits are centered and always rotated by 90 degrees. The goal of the distribution transformer 108 is thus to learn to rotate the digits in the input samples 304A by 90 degrees while keeping them centered in the same position. As can be seen by output sample 306A, the distribution transformer 108 successfully rotated each of the input samples 304A by 90 degrees while keeping them centered.

In the example of FIG. 3B, the probabilistic grammar 102 generates input samples 304B, as represented by the scene graphs 106, that are upright and centered, like regular MNIST digits. The target data, V, and real images, $X_R$, are images 302B where digits are always rotated by 90 degrees, and moved to the bottom left corner of their respective segment of the canvas. The goal of the distribution transformer 108 is thus to learn to rotate the digits in the input samples 304A by 90 degrees while also translating the digits to the bottom left of the respective segments of the canvas. As can be seen by output sample 306A, the distribution transformer 108 successfully rotated each of the input samples 304A by 90 degrees and translated the samples to the bottom left of the respective segments of the canvas.

As a result, training directly on the input scenes coming from the probabilistic grammar 102 results in just above random performance. However, using the distribution transformer 108 within the processes 100 and 200 to account for the distribution gaps between the scenes generated by the probabilistic grammar 102 and the real-world scenes, the accuracy of the downstream task network was greater than 99%. More specifically, with respect to the example of FIG. 3A, the accuracy using the probabilistic grammar 102 was 14.8% while the accuracy using the distribution transformer 108 was 99.5%. Similarly, with respect to the example of FIG. 3B, the accuracy using the probabilistic grammar 102 was 13.1% while the accuracy using the distribution transformer 108 was 99.3%.

Figure 4A:
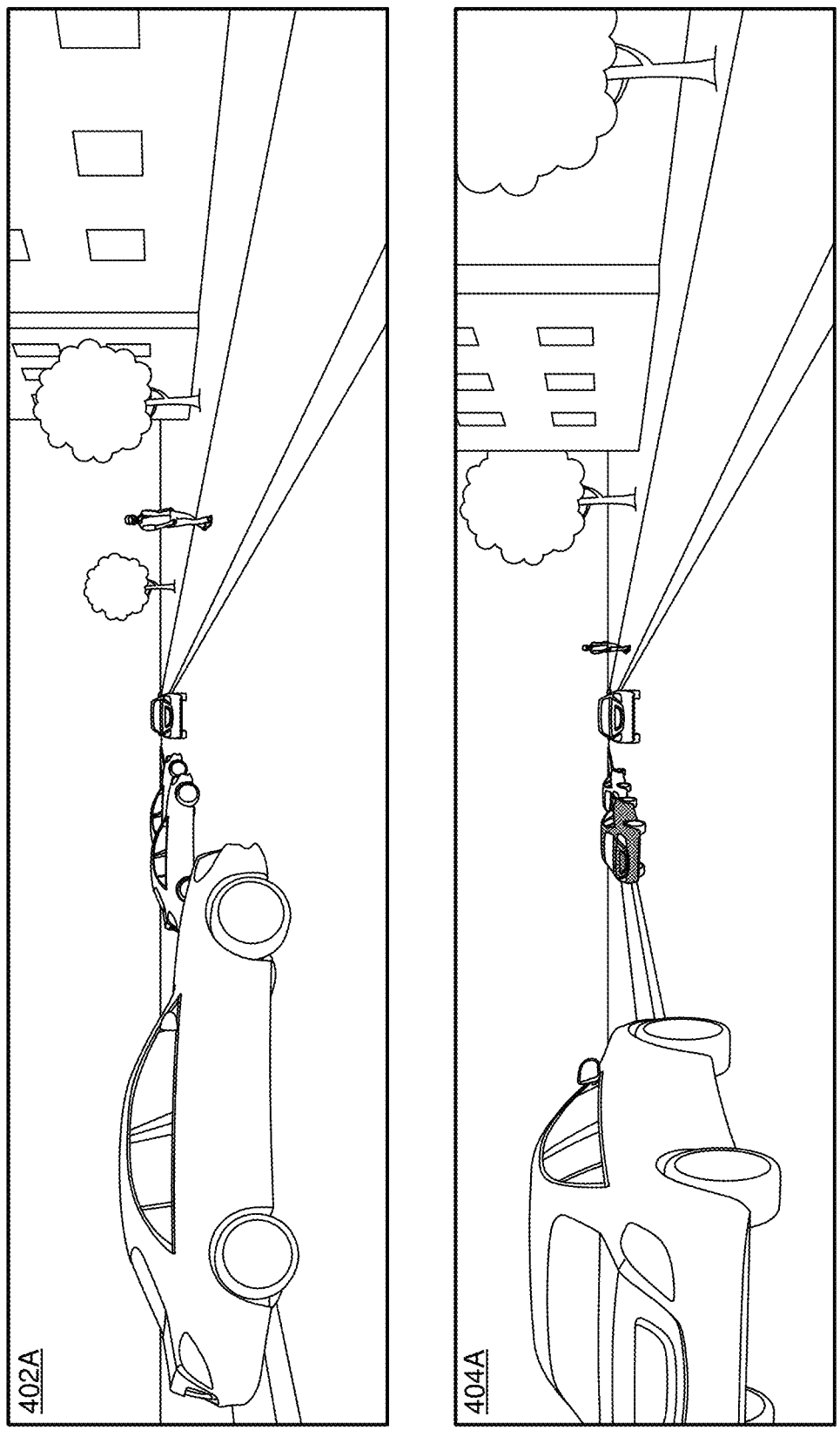
FIGS. 4A-4B are example illustrations of using real-world distributions and synthetic distributions to train a distribution transformer model to compute transformed scene graphs, in accordance with some embodiments of the present disclosure.
Figure 4B:
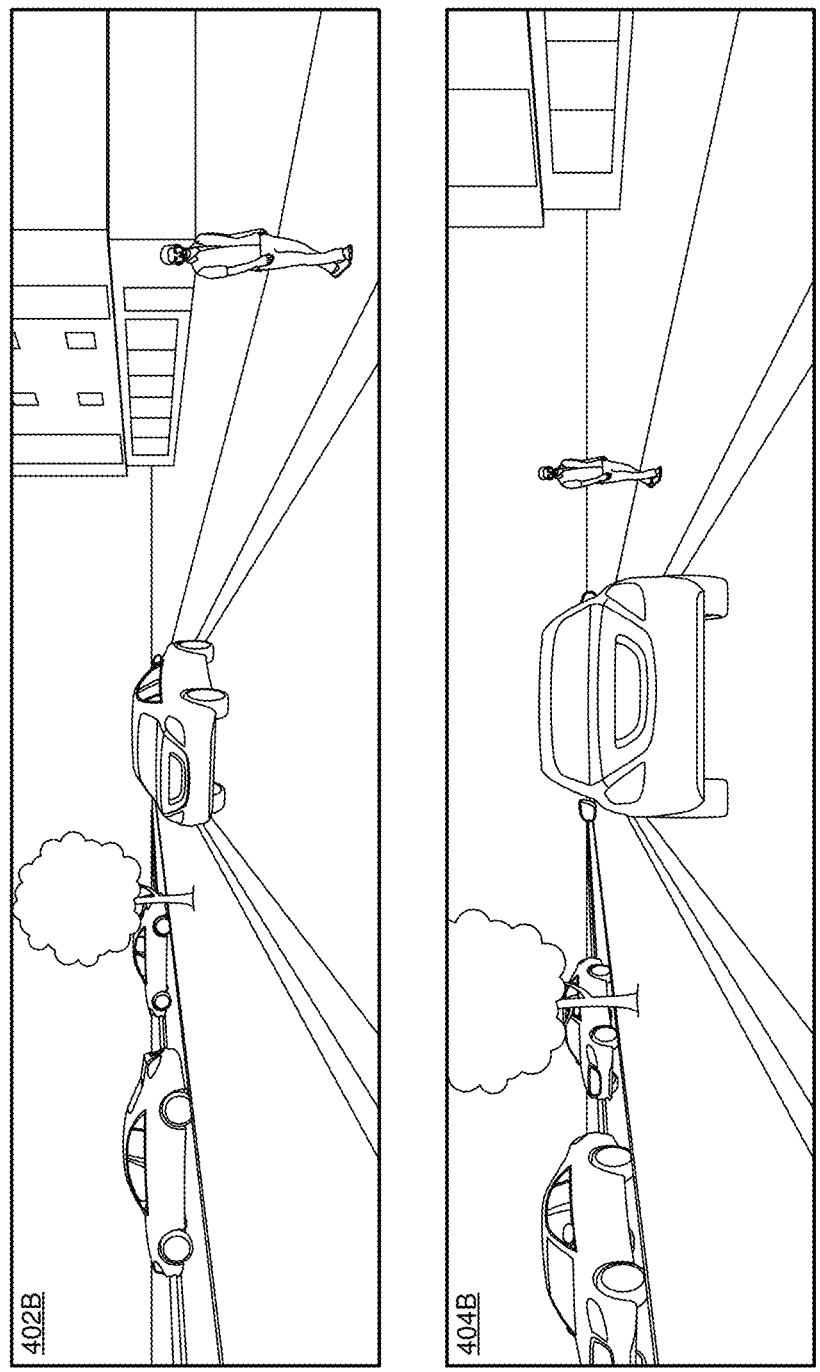

Now referring to FIGS. 4A-4B, FIGS. 4A-4B are example illustrations of using real-world distributions and synthetic distributions to train a distribution transformer model to compute transformed scene graphs, in accordance with some embodiments of the present disclosure. For example, after validating the processes 100 and 200 in a simulated setting on the MNIST dataset and 2D aerial views (as described in U.S. Provisional Application No. 62/827,313, filed on Apr. 1, 2019, and U.S. Provisional Application No. 62/768,846, filed on Nov. 16, 2018, which are hereby incorporated by reference in their entirety), the processes 100 and 200 were evaluated for a task network trained for the downstream task of object detection. The KITTI dataset was used as the validation set, V, and the real-world imagery, $X_R$. More specifically, in this experiment, the validation set, V, includes one-hundred random images taken from the KITTI training set which includes corresponding ground truth labels. The remaining training data (images only) forms $X_R$. The KITTI dataset includes challenging traffic scenarios and scenes ranging from highways to urban to more rural neighborhoods. In addition, the KITTI dataset includes an easy subset, a moderate subset, and a hard subset, ranging in number of images and complexity of the scenes. Contrary to some previous experiments, the distribution gap between the real-world distributions (e.g., distribution 216 of FIG. 2B) and the synthetic distributions (e.g., distribution 214 of FIG. 2B) arises naturally here.

The probabilistic grammar 102 defines road scenarios, such as a road scene grammar. The scene graphs 106 sampled from the probabilistic grammar 102 may be rendered in three-dimensions (3D) by the renderer 112, which may be a game engine, in non-limiting embodiments. Images 402A and 402B may represent the rendering generated from the scene graphs 106 sampled from the probabilistic grammar 102. As can be seen, the images 402A and 402B include vehicles, trees, buildings, sidewalks, and a pedestrian at certain orientations, sizes, colors, poses, locations, textures, and the like. The images 402A and 402B are line drawing representations of two of the images in the left-hand column of FIG. 12 in U.S. Provisional Application No. 62/827,313, filed on Apr. 1, 2019, and U.S. Provisional Application No. 62/768,846, filed on Nov. 16, 2018, which are hereby incorporated by reference in their entirety. Images 404A and 404B represent the renderings generated from the transformed scene graphs 110 computed by the distribution transformer 108. As can be seen, the images 404A and 404B include vehicles, trees, buildings, sidewalks, and a pedestrian at certain orientations, sizes, colors, poses, locations, textures, and the like, that are different from the images 402A and 402B. In fact, the representations in the images 404A and 404B includes the vehicles well-aligned with the road, and the distances between the vehicles is meaningful. In addition, the location of the camera, and thus the field of view, may be different in addition to small changes in the locations and other attributes of trees, pedestrians, and buildings. The images 404A and 404B are line drawing representations of two of the images in the middle-hand column of FIG. 12 in U.S. Provisional Application No. 62/827,313, filed on Apr. 1, 2019, and U.S. Provisional Application No. 62/768,846, filed on Nov. 16, 2018, which are hereby incorporated by reference in their entirety.

In order to reduce complexity from rendering and numerical gradients, the distribution transformer 108 was trained optimize specific parts of the scene sequentially. For example, attributes related to cars were optimized first, then car and camera parameters were optimized, and then parameters of contextual elements (e.g., buildings, pedestrians, trees, etc.) were added together to the training. As such, in embodiments of the present disclosure, one or more parameters may be optimized first, followed by additional parameters, or the parameters may all be optimized at one time. In addition, distribution and task training may be decoupled (e.g., with respect to the experiments of FIGS. 4A-4B, the distribution transformer 108 was first trained for distribution according to the process 200B and then trained for the meta-task of object detection according to the process 200C). As such, in some examples, the training for distribution and tasks may be performed at overlapping times, or they may be performed at different times. The task network used was a region-based convolutional neural network (RCNN) tuned for object detection.

The results of the experiment were quantified using mean average precision at 0.5 intersection over union (IoU), which measures the overlap between two boundaries. For example, the predictions of the task network trained according to the process 100 and 200 may be bounding shapes, and the KITTI validation set, V, may include corresponding bounding shapes. As such, the bounding shapes predicted by the task network after training on the synthetic data may compared against the bounding shapes from the validation set, V, to determine the IoU. Where the scene graphs 106 were used to render the synthetic data and train the task network, the mean average precision on the easy dataset was 63.7, on the moderate dataset was 63.7, and on the hard dataset was 62.2. In contrast, where the transformed scene graphs 110—optimized for cars only using only the distribution training of the process 200B—were used to render the synthetic data and train the task network, the mean average precision on the easy dataset was 66.4, on the moderate dataset was 66.5, and on the hard dataset was 65.6. Similarly, where the transformed scene graphs 110—optimized for cars and camera parameters using only the distribution training of the process 200B—were used to render the synthetic data and train the task network, the mean average precision on the easy dataset was 65.9, on the moderate dataset was 66.3, and on the hard dataset was 65.9. As another example, where the transformed scene graphs 110—optimized for cars, camera parameters, and contextual features using only the distribution training of the process 200B—were used to render the synthetic data and train the task network, the mean average precision on the easy dataset was 65.9, on the moderate dataset was 66.3, and on the hard dataset was 66.0. As yet another example, where the transformed scene graphs 110—optimized for cars, camera parameters, and contextual features using both the distribution training of the process 200B and the task training of the process 200C—were used to render the synthetic data and train the task network, the mean average precision on the easy dataset was 66.7, on the moderate dataset was 66.3, and on the hard dataset was 66.2. As such, with respect to each of the different training types and parameter optimization types, the results when using the distribution transformer 108 to generate the transformed scene graphs 110 outperformed using only scene graphs 106 from the probabilistic grammar 102.

In addition, since the validation set, V, included labelled training data, a valid baseline is to train the models on V (e.g., the one-hundred images from the KITTI training data). By only training with V and fine-tuning using V, according to the process 200B, the mean average precision for using the scene graphs 106 sampled from the probabilistic grammar 102 resulted in 71.3 on the easy dataset, 72.7 on the moderate dataset, and 72.7 on the hard dataset. In contrast, by only training with V and fine-tuning using V, according to the process 200B, the mean average precision for using the transformed scene graphs 110 transformed by the distribution transformer 108 resulted in 72.4 on the easy dataset, 73.9 on the moderate dataset, and 73.9 on the hard dataset. As such, these quantitative training results indicate that the task training of the process 200C provides increases in accuracy even where the distribution transformer is not optimized for attribute distribution gaps according to the process 200B. In addition, where the distribution training of the process 200B and the task training of the process 200C are both implemented, the most accurate results are realized.

Figure 5B:
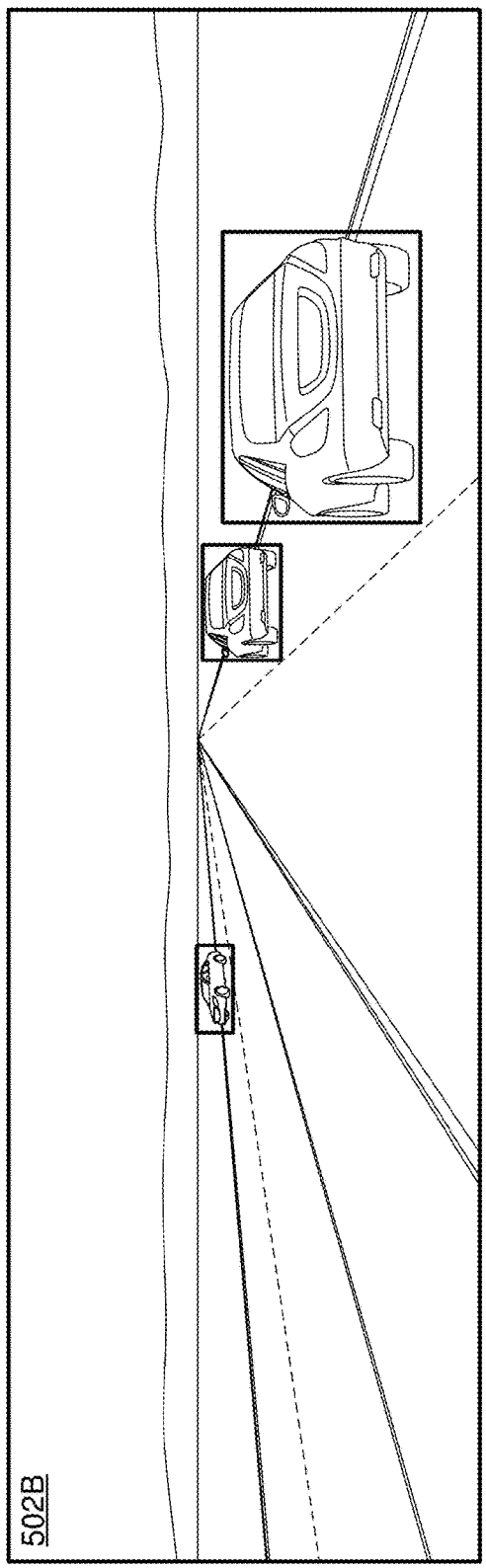
Figure 5B:
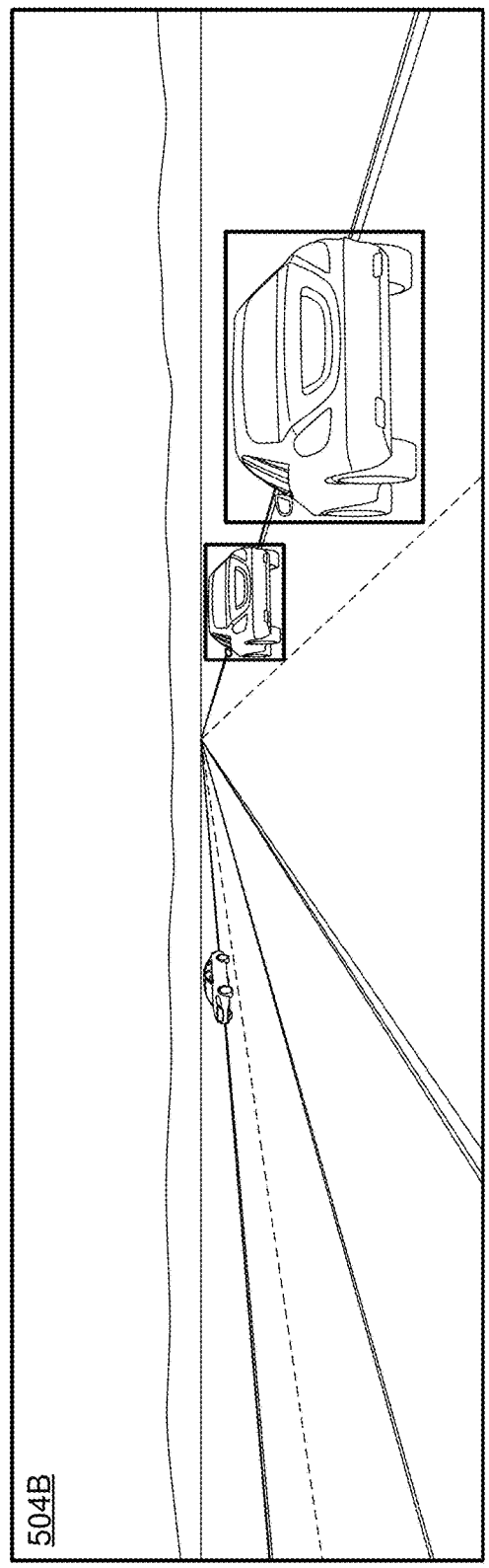

Now referring to FIGS. 5A-5B, FIGS. 5A-5B are example illustrations of downstream task network performance when using synthetic datasets generated by a distribution transformer model as compared to a baseline model, in accordance with some embodiments of the present disclosure. For example, images 502A and 502B illustrate the predictions of a task network trained using the transformed scene graphs 110 from the processes 100 and 200 described herein, while images 504A and 504B illustrate the predictions of the same task network trained using scenes generated from the scene graphs 106 only, without use of the distribution transformer 108. As seen in FIGS. 5A-5B, the images 502A and 502B depict more accurate object detections than the images 504A and 504B. The images 502A and 502B are line drawings sampled from the bottom column of FIG. 14, and the images 504A and 504B are line drawings sampled from the top column of FIG. 14 of U.S. Provisional Application No. 62/827,313, filed on Apr. 1, 2019, and U.S. Provisional Application No. 62/768,846, filed on Nov. 16, 2018, which are hereby incorporated by reference in their entirety.

Figure 6:
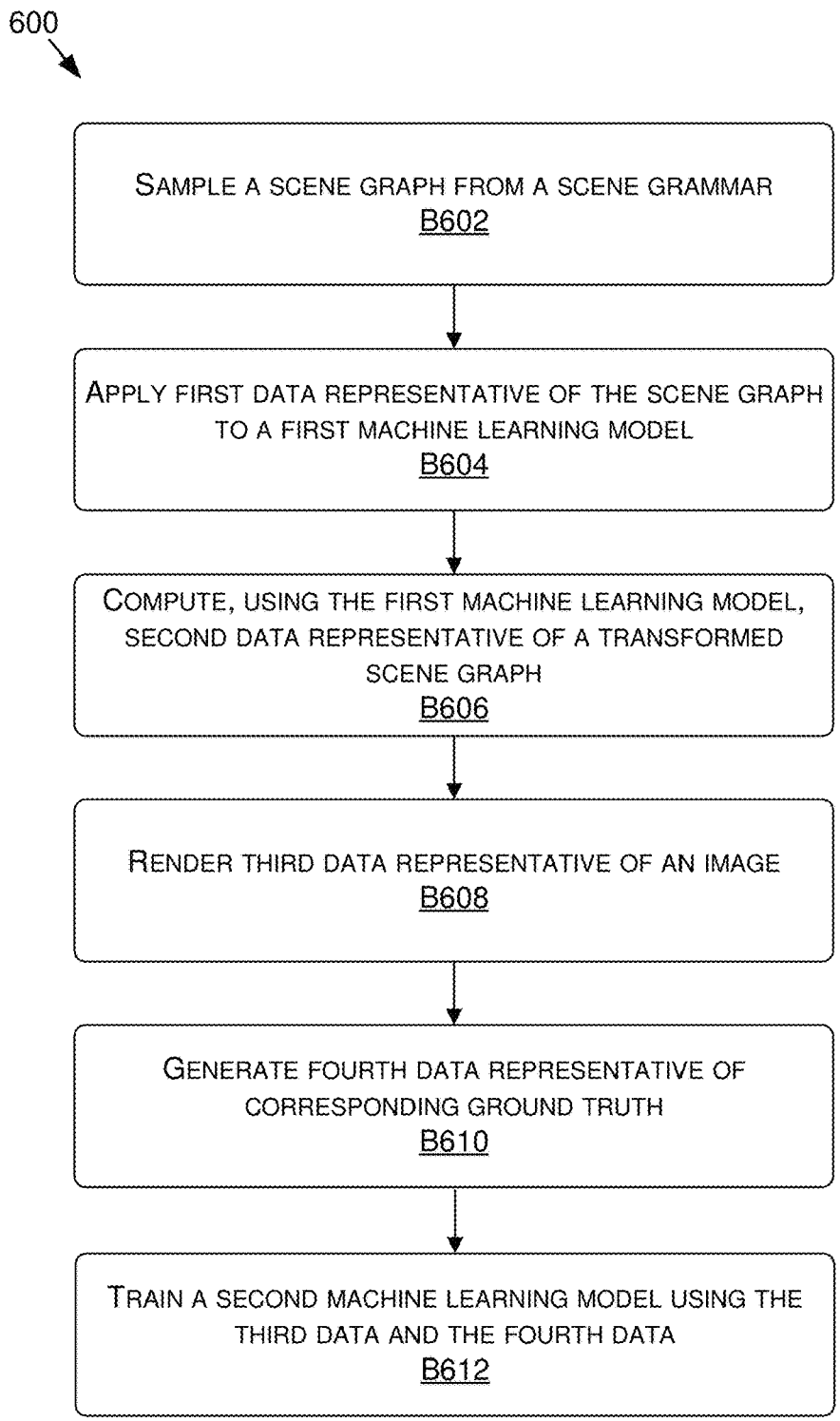
FIG. 6 is a flow diagram showing a method for training a distribution transformer model to compute transformed scene graphs, in accordance with some embodiments of the present disclosure.
Figure 7:
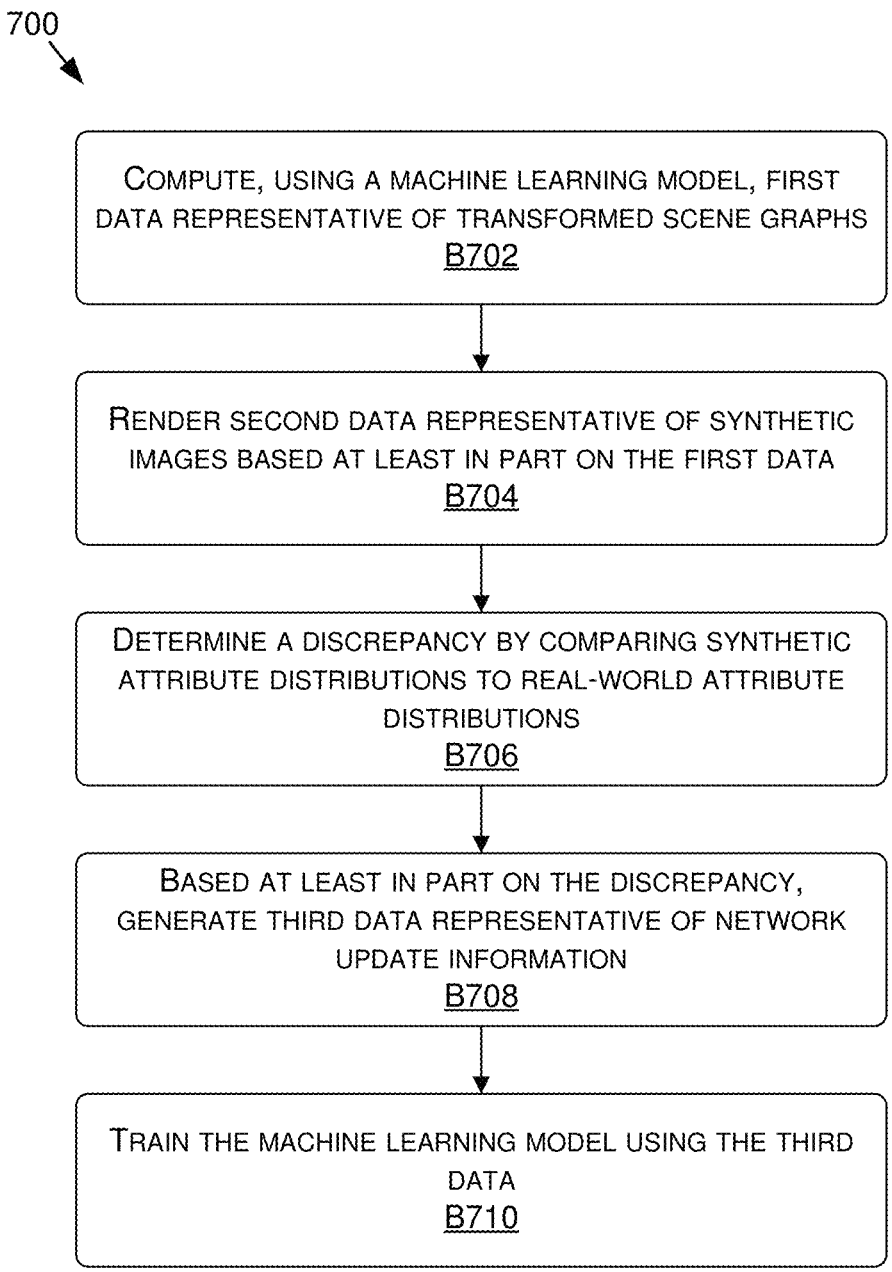
FIG. 7 is a flow diagram showing a method for training a downstream task network using synthetic datasets generated using a distribution transformer model, in accordance with some embodiments of the present disclosure.

Now referring to FIGS. 6-7, each block of methods 600 and 700, described herein, comprises a computing process that may be performed using any combination of hardware, firmware, and/or software. For instance, various functions may be carried out by a processor executing instructions stored in memory. The methods 600 and 700 may also be embodied as computer-usable instructions stored on computer storage media. The methods 600 and 700 may be provided by a standalone application, a service or hosted service (standalone or in combination with another hosted service), or a plug-in to another product, to name a few. In addition, methods 600 and 700 are described, by way of example, with respect to the processes of FIG. 1 and FIGS. 2A-2C. However, these methods 600 and 700 may additionally or alternatively be executed by any one system (e.g., using some or all of the components of example computing device 800 of FIG. 8), within any one process, or any combination of systems or processes, including, but not limited to, those described herein.

FIG. 6 is a flow diagram showing a method 600 for training a distribution transformer model to compute transformed scene graphs, in accordance with some embodiments of the present disclosure. The method 600, at block B602, includes sampling a scene graph from a scene grammar. For example, the scene graph 106 may be sampled from the probabilistic grammar 102.

The method 600, at block B604, includes applying first data representative of the scene graph to a first machine learning model. For example, the scene graph 106 may be applied to the distribution transformer 108.

The method 600, at block B606, includes computing, using the first machine learning model, second data representative of a transformed scene graph. For example, the distribution transformer 108 may compute the transformed scene graph 110 based at least in part on processing the scene graph 106.

The method 600, at block B608, includes rendering third data representative of an image. For example, the renderer may render the images 114 corresponding to the synthetic dataset.

The method 600, at block B610, includes generating fourth data representative of corresponding ground truth.

For example, the renderer 112 or another component may generate the ground truth 116 from using the image data, the transformed scene graph 110, and/or other information.

The method 600, at block B612, includes training a second machine learning model using the third data and the fourth data. For example, the task network may be trained by the task network trainer 118 using the images 114 and the ground truth 116.

FIG. 7 is a flow diagram showing a method 700 for training a downstream task network using synthetic datasets generated using a distribution transformer model, in accordance with some embodiments of the present disclosure. The method 700, at block B702, includes computing, using a machine learning model, first data representative of transformed scene graphs. For example, the distribution transformer 108 may generate the transformed scene graphs 110 using the scene graphs 106 sampled from the probabilistic grammar 102 as input.

The method 700, at block B704, includes rendering second data representative of synthetic images based at least in part on the first data. For example, the generated synthetic scenes may be rendered using the renderer 112 and based at least in part on the transformed scene graphs 110.

The method 700, at block B706, includes determining a discrepancy by comparing synthetic attribute distributions to real-world attribute distributions. For example, the MMD 218 may be determined by comparing the distribution 214 corresponding to the generated synthetic scenes 210 to the distribution 216 corresponding to the real scenes 212.

The method 700, at block B708, includes, based at least in part on the discrepancy, generating third data representative of network update information. For example, the MMD 218 may be used to generate ground truth or other network training information for updating parameters of the distribution transformer 108.

The method 700, at block B710, includes training the machine learning model using the third data. For example, the discrepancy or other network update information generated as a result thereof may be back-propagated to the distribution transformer 108 to update the parameters of the distribution transformer. As a result, and over time, the distributions 214 corresponding to the generated synthetic scenes 210 may become more similar to the distributions 216 corresponding to the real scenes 212.

Figure 8:
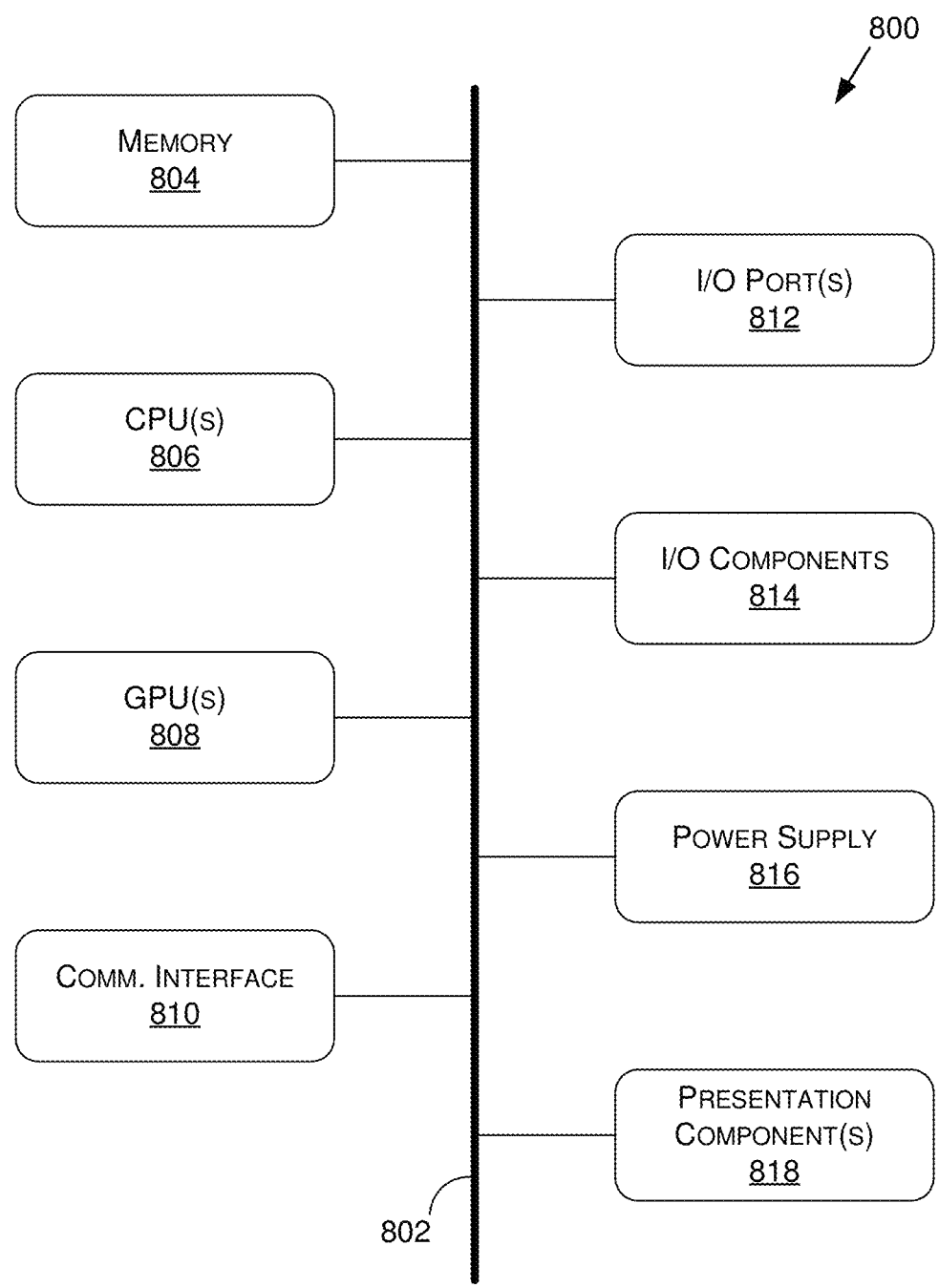
FIG. 8 is a block diagram of an example computing device suitable for use in implementing some embodiments of the present disclosure.

FIG. 8 is a block diagram of an example computing device 800 suitable for use in implementing some embodiments of the present disclosure. Computing device 800 may include a bus 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, and one or more presentation components 818 (e.g., display(s)).

Although the various blocks of FIG. 8 are shown as connected via the bus 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The bus 802 may represent one or more busses, such as an address bus, a data bus, a control bus, or a combination thereof. The bus 802 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 806 may be configured to execute the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an ARM processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

The GPU(s) 808 may be used by the computing device 800 to render graphics (e.g., 3D graphics). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data. The display memory may be included as part of the memory 804. The GPU(s) 708 may include two or more GPUs operating in parallel (e.g., via a link). When combined together, each GPU 808 may generate pixel data for different portions of an output image or for different output images (e.g., a first GPU for a first image and a second GPU for a second image). Each GPU may include its own memory, or may share memory with other GPUs.

In examples where the computing device 800 does not include the GPU(s) 808, the CPU(s) 806 may be used to render graphics. In any embodiment, the CPU(s) 806 and/or the GPU(s) 808 may be used, in combination with a graphics engine, such as a game engine, to render the synthetic datasets, $D(\theta)$, for use in determining the MMD 218 and/or training the task networks. For example, because of the ability of GPU(s) 808 to render photo-realistic images, especially using technologies such as ray-tracing, the synthetic datasets may more closely resemble the real-world scenes not only in context but also in visual appearance (e.g., bridging the domain gap).

The communication interface 810 may include one or more receivers, transmitters, and/or transceivers that enable the computing device 700 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments (e.g., cloud environments) where tasks are performed by remote-processing devices that are linked through a communications network. For example, the processes 100 and 200, or portions thereof, may be executed using a cloud infrastructure, such as cloud-based GPU servers capable of efficient graphics processing and rendering.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   computing, using at least one machine learning model and based at least in part on first data representative of one or more initial scene graphs, second data representative of one or more transformed scene graphs including one or more transformed attributes different from one or more initial attributes corresponding to the one or more initial scene graphs;
   rendering third data representative of one or more synthetic images based at least in part on the second data;
   determining at least one discrepancy by, at least in part, comparing one or more synthetic attribute distributions corresponding to the one or more synthetic images to one or more real-world attribute distributions corresponding to one or more real-world images;
   based at least in part on the at least one discrepancy, generating fourth data representative of network update information; and
   training the at least one machine learning model using the fourth data.

2. The method of claim 1, wherein at least one of the one or more synthetic attribute distributions or the one or more real-world attribute distributions are determined at least in part by:
   applying fifth data representative of at least one of the one or more real-world images or the one or more synthetic images to at least one other machine learning model trained for feature extraction; and
   determining at least one of the one or more synthetic attribute distributions or the one or more real-world attribute distributions based at least in part on output of the at least one other machine learning model.

3. The method of claim 1, wherein one or more initial scene graphs are sampled from a probabilistic scene grammar.

4. The method of claim 1, wherein the at least one machine learning model includes a graph convolutional network.

5. The method of claim 1, wherein the at least one discrepancy includes a maximum mean discrepancy (MMD).

6. The method of claim 1, further comprising:
   training at least one other machine learning model using the one or more synthetic images and corresponding ground truth;
   testing the at least one other machine model on a real-world validation set;
   determining at least one performance score of the at least one other machine learning model based at least in part on the testing; and
   further training the at least one machine learning model based at least in part on the at least one performance score.

7. The method of claim 6, wherein at least one first loss function is used for the training the at least one machine learning model using the fourth data and at least one second loss function is used for the training the at least one machine learning model based at least in part on the at least one performance score, the at least one first loss function being different from the at least one second loss function.

8. The method of claim 6, wherein the ground truth is automatically generated based at least in part on the third data.

9. The method of claim 1, wherein one or more parameters of the at least one machine learning model are initialized by, at least in part, training the at least one machine learning model to compute one or more updated scene graphs such that the one or more updated scene graphs are within a threshold similarity to the one or more initial scene graphs.

10. The method of claim 1, wherein initializing one or more parameters of the at least one machine learning model is performed using at least one auto-encoder.

11. A system comprising:
    a computing device including one or more processing devices to cause instantiation of:
    a distribution transformer to compute, using at least one machine learning model and based at least in part on first data representative of one or more initial scene graphs, second data representative of one or more transformed scene graphs each including one or more transformed attributes different from one or more initial attributes corresponding to the one or more initial scene graphs;
    a renderer to render third data representative of one or more synthetic images based at least in part on the second data;
    a discrepancy determiner to determine at least one discrepancy between one or more synthetic attribute distributions corresponding to the one or more synthetic images and one or more real-world attribute distributions corresponding to one or more real-world images; and
    a model trainer to generate fourth data representative of network update information for training the at least one machine learning model, the network update information generated based at least in part on the third data.

12. The system of claim 11, wherein the one or more processing devices are further to cause instantiation of:
    a task network trainer to train at least one task network using the third data and the fourth data; and
    a task network validator to determine at least one performance score for the at least one task network when processing at least one real-world validation set,
    wherein the model trainer further trains the at least one machine learning model based at least in part on the at least one performance score.

13. The system of claim 11, wherein the distribution transformer includes at least one graph convolutional network.

14. The system of claim 11, wherein the model trainer uses at least one first loss function to train the at least one machine learning model using the fourth data and at least one second loss function different from the at least one first loss function to train the at least one machine learning model based at least in part on at least one performance score.

15. A processor comprising:
    one or more circuits to:
    compute, using at least one machine learning model and based at least in part on one or more initial scene graphs, one or more transformed scene graphs including one or more transformed attributes different from one or more initial attributes corresponding to the one or more initial scene graphs;
    render one or more synthetic images based at least in part on the one or more transformed scene graphs;
    determine at least one discrepancy by, at least in part, comparing one or more synthetic attribute distributions corresponding to the one or more synthetic images to one or more real-world attribute distributions corresponding to one or more real-world images;

based at least in part on the at least one discrepancy, generate network update information; and train the at least one machine learning model using the network update information.

16. The processor of claim 15, wherein at least one of the one or more synthetic attribute distributions or the one or more real-world attribute distributions are determined at least in part by:
applying at least one of the one or more real-world images or the one or more synthetic images to at least one other machine learning model trained for feature extraction; and
determining at least one of the one or more synthetic attribute distributions or the one or more real-world attribute distributions based at least in part on output of the at least one other machine learning model.

17. The processor of claim 15, wherein one or more initial scene graphs are sampled from a probabilistic scene grammar.

18. The processor of claim 15, wherein the at least one machine learning model includes a graph convolutional network.

19. The processor of claim 15, wherein the at least one discrepancy includes a maximum mean discrepancy (MMD).

20. The processor of claim 15, wherein the one or more circuits are further to:
train at least one other machine learning model using the one or more synthetic images and corresponding ground truth;
test the at least one other machine model on a real-world validation set;
determine at least one performance score of the at least one other machine learning model based at least in part on the testing; and
further train the at least one machine learning model based at least in part on the at least one performance score.

21. The processor of claim 20, wherein the ground truth is automatically generated based at least in part on the one or more synthetic images.

22. The processor of claim 15, wherein at least one first loss function is used for the training the at least one machine learning model using the network update information and at least one second loss function is used for the training the at least one machine learning model based at least in part on at least one performance score, the at least one first loss function being different from the at least one second loss function.

23. The processor of claim 15, wherein one or more parameters of the at least one machine learning model are initialized by, at least in part, training the at least one machine learning model to compute one or more updated scene graphs such that the one or more updated scene graphs are within a threshold similarity to the one or more initial scene graphs.

* * * * *